(12) United States Patent
Tanaka et al.

(10) Patent No.: US 10,778,854 B2
(45) Date of Patent: Sep. 15, 2020

(54) IMAGE FORMING APPARATUS FOR DETECTING CAUSAL PART OF STREAK OCCURRING AT TIME OF IMAGE FORMING

(71) Applicant: CANON KABUSHIKI KAISHA, Tokyo (JP)

(72) Inventors: Sumito Tanaka, Tokyo (JP); Toshihisa Yago, Toride (JP); Hiroshi Tomii, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/049,842

(22) Filed: Jul. 31, 2018

(65) Prior Publication Data

US 2019/0045068 A1 Feb. 7, 2019

(30) Foreign Application Priority Data

Aug. 4, 2017 (JP) .................................. 2017-151757

(51) Int. Cl.
*H04N 1/00* (2006.01)
*G03G 15/00* (2006.01)

(52) U.S. Cl.
CPC ..... *H04N 1/00045* (2013.01); *G03G 15/5062* (2013.01); *G03G 15/55* (2013.01); *H04N 1/00063* (2013.01); *H04N 1/00076* (2013.01)

(58) Field of Classification Search
CPC .......... H04N 1/00045; H04N 1/00063; H04N 1/00076; G03G 15/5062; G03G 15/55; G03G 15/5041; G03G 15/5058
USPC ............... 358/504, 1.11–1.18, 1.9, 2.1, 3.26; 382/112, 216
See application file for complete search history.

(56) References Cited

U.S. PATENT DOCUMENTS

| 5,481,337 | A | 1/1996 | Tsuchiya et al. |
| 9,055,264 | B2 | 6/2015 | Horita |
| 9,678,463 | B2 | 6/2017 | Tanaka |
| 2007/0195351 | A1* | 8/2007 | Mashtare ............... G06K 15/00 358/1.13 |
| 2008/0101808 | A1 | 5/2008 | Shih et al. |
| 2008/0126860 | A1 | 5/2008 | Sampath et al. |
| 2008/0145079 | A1* | 6/2008 | Cho .................. G03G 15/5058 399/60 |
| 2010/0143006 | A1 | 6/2010 | Yamada et al. |

(Continued)

FOREIGN PATENT DOCUMENTS

| EP | 2 950 152 A2 | 12/2015 |
| JP | 2017-083544 A | 5/2017 |

OTHER PUBLICATIONS

U.S. Appl. No. 16/049,844, filed Jul. 31, 2018, Hiroshi Tomii Toshihisa Yago Sumito Tanaka.

(Continued)

*Primary Examiner* — Chad Dickerson
(74) *Attorney, Agent, or Firm* — Venable LLP

(57) ABSTRACT

In an image forming apparatus including a reader that can read an original and a printer that can form an image on a sheet based on a read result of the reader, a controller can control the printer to form a test chart on the sheet and control the reader to read the test chart. The test chart is used for detecting a causal part of a streak that occurs when an image is formed by the printer. The test chart has a pattern for obscuring an image defect occurring when the test chart is formed by the printer.

11 Claims, 30 Drawing Sheets

(56) References Cited

U.S. PATENT DOCUMENTS

| | | | |
|---|---|---|---|
| 2010/0278548 A1 | 11/2010 | Burry et al. | |
| 2011/0019245 A1* | 1/2011 | Adachi | H04N 1/00013 |
| | | | 358/448 |
| 2011/0158668 A1 | 6/2011 | Fuse et al. | |
| 2015/0170008 A1* | 6/2015 | Hashizume | H04N 1/00037 |
| | | | 358/1.15 |
| 2015/0192884 A1* | 7/2015 | Sone | G03G 15/5058 |
| | | | 399/49 |
| 2015/0346627 A1* | 12/2015 | Okugawa | G03G 15/043 |
| | | | 347/118 |
| 2016/0117576 A1* | 4/2016 | Horita | H04N 1/4055 |
| | | | 358/3.3 |
| 2017/0219979 A1* | 8/2017 | Arimoto | G03G 15/553 |
| 2017/0308017 A1 | 10/2017 | Tomii | |
| 2018/0046113 A1* | 2/2018 | Katahira | G03G 15/161 |
| 2019/0041784 A1* | 2/2019 | Yago | G03G 15/01 |
| 2019/0041785 A1* | 2/2019 | Tomii | G03G 15/0808 |

OTHER PUBLICATIONS

U.S. Appl. No. 16/049,846, filed Jul. 31, 2018, Toshihisa Yago Sumito Tanaka Hiroshi Tomii.

Extended European Search Report dated Nov. 15, 2018, in European Patent Application No. 18185486.0.

Extended European Search Report dated Nov. 15, 2018, in European Patent Application No. 18185488.6.

\* cited by examiner

F I G. 7

| STREAK TYPE | REPLACEMENT PART | PLAIN PORTION W | PATTERN WHERE STREAK OCCURS | DIGITAL PATTERN | ANALOG PATTERN | IMPACT OF LOWERING CHARGING POTENTIAL |
|---|---|---|---|---|---|---|
| DEVELOPING COAT DEFECT STREAK | DEVELOPING UNIT FOR COLOR OF OCCURRENCE | NO STREAK | ONLY COLOR OF OCCURRENCE | STREAK PRESENT | STREAK PRESENT | NO IMPACT |
| EXPOSURE DEFECT WHITE STREAK | EXPOSURE APPARATUS FOR COLOR OF OCCURRENCE (CLEANING MAINTENANCE) | NO STREAK | ONLY COLOR OF OCCURRENCE | STREAK PRESENT | NO STREAK | NO IMPACT |
| CHARGE DEFECT STREAK | PROCESS CARTRIDGE FOR COLOR OF OCCURRENCE | NO STREAK | ONLY COLOR OF OCCURRENCE | STREAK PRESENT | STREAK PRESENT | STREAK IMPROVED |
| BELT PLASTICITY DEFORMATION STREAK | INTERMEDIATE TRANSFER UNIT | NO STREAK | ALL COLORS | STREAK PRESENT | STREAK PRESENT | NO IMPACT |
| DRUM CLEANING DEFECT STREAK | PROCESS CARTRIDGE FOR COLOR OF OCCURRENCE | STREAK PRESENT (MONOCHROME) | ALL COLORS | STREAK PRESENT | STREAK PRESENT | NO IMPACT |
| BELT CLEANING DEFECT STREAK | TRANSFER BELT CLEANER | STREAK PRESENT (MIXED COLORS) | ALL COLORS | STREAK PRESENT | STREAK PRESENT | NO IMPACT |

MAIN →

MAIN →

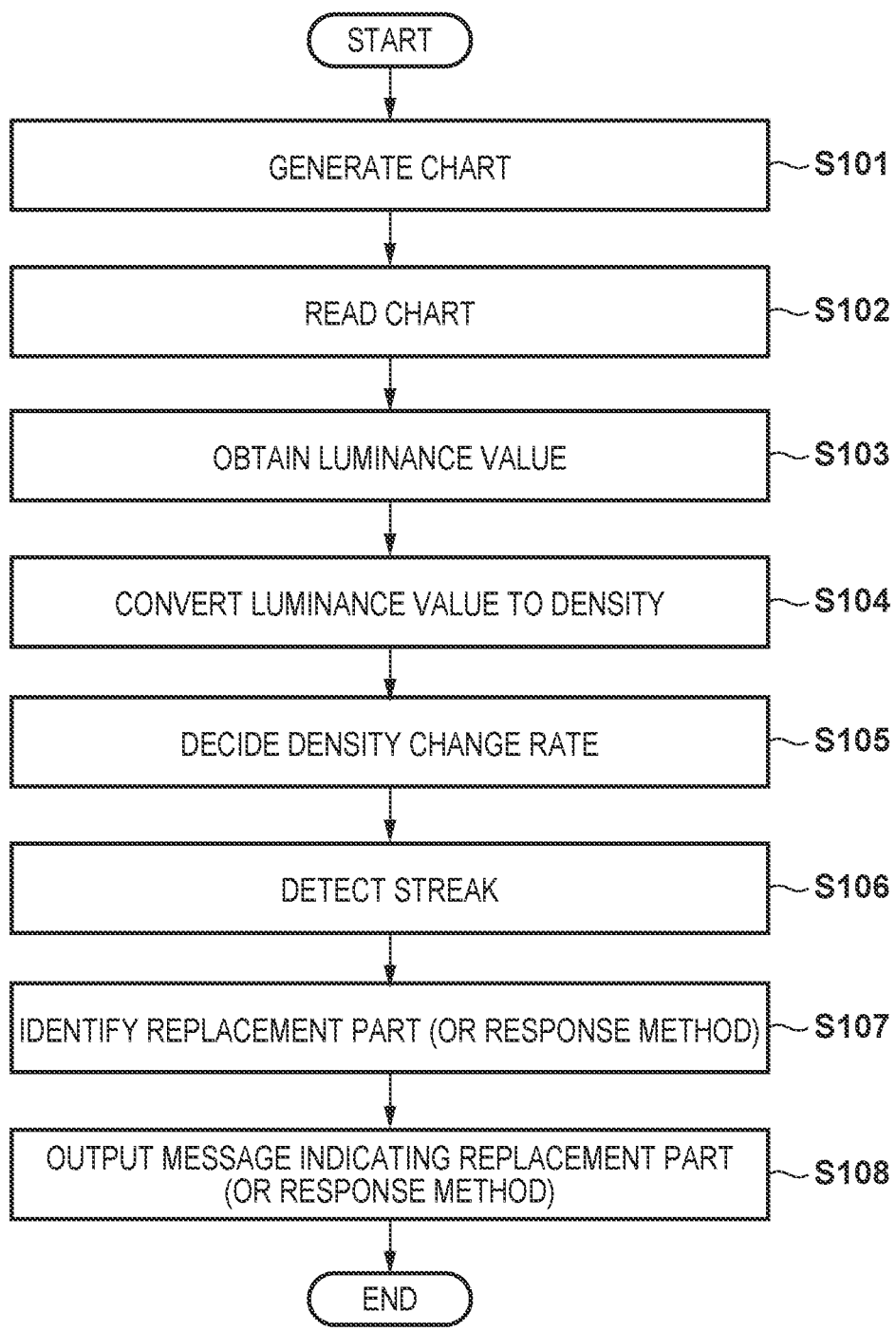

FIG. 15
IMAGE DIAGNOSIS
DIAGNOSIS RESULT: IMAGE QUALITY PROBLEM OCCURRED!
STREAK OCCURRED IN SUB SCANNING DIRECTION
CODE: 
REPLACEABLE UNIT: 
OK

F I G. 18

| NAME | Space-X [mm] | Ca-Width [mm] |
|---|---|---|
| 1 Dooley | 1.99 | 0.04 |
| 3 Dooley | 1.91 | 0.13 |
| 6 Dooley | 1.78 | 0.25 |
| 12 Dooley | 1.52 | 0.51 |
| 24 Dooley | 1.02 | 1.02 |

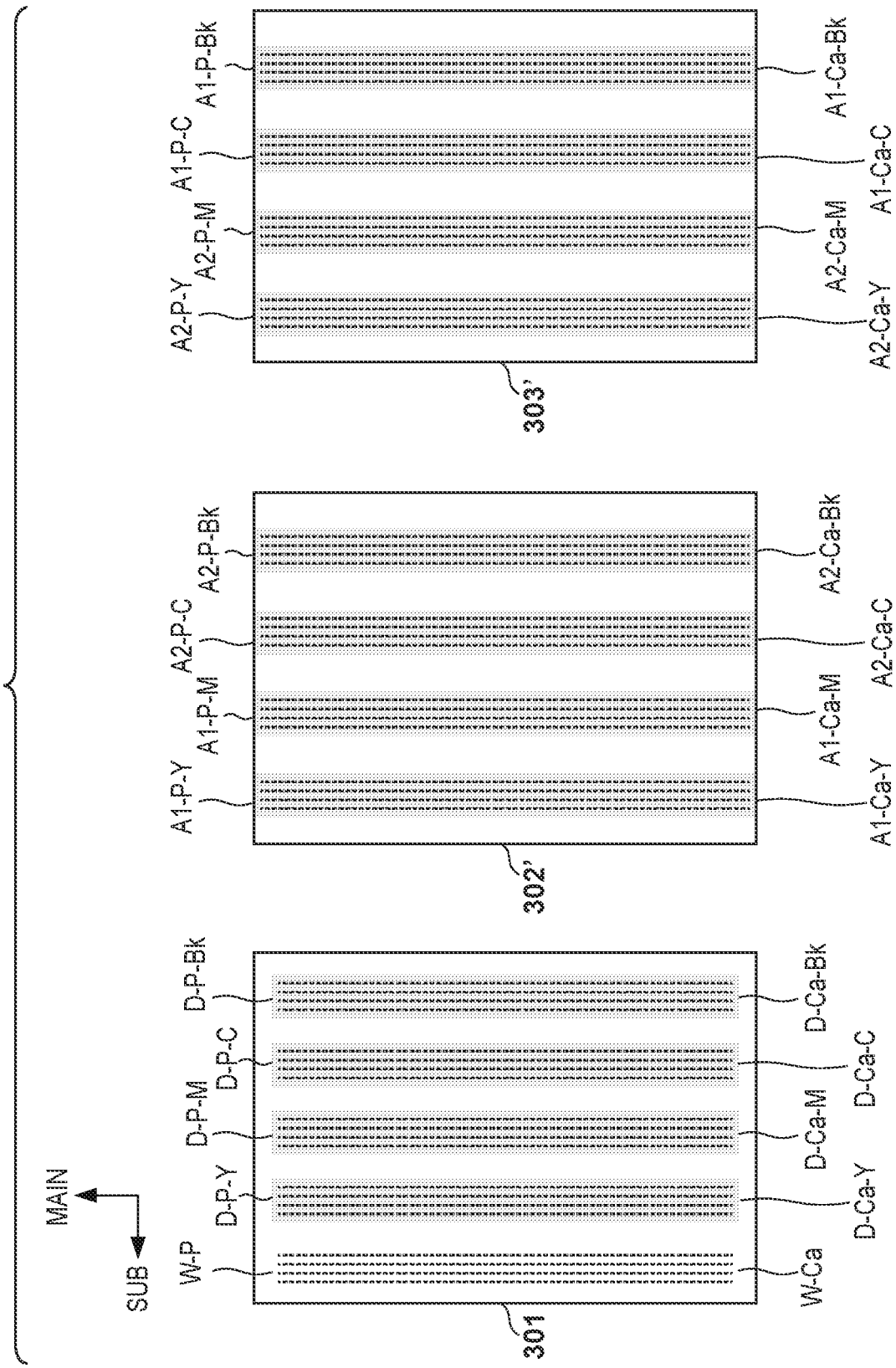

FIG. 21A

| IMAGE PATTERN | W-P | D-P-Y | D-P-M | D-P-C | D-P-Bk | FIRST SHEET (CHART 301) | | | | A1-P-Y | A1-P-M | A2-P-Y | A2-P-M | A2-P-C | A2-P-Bk | SECOND SHEET (CHART 302) | | | | A1-P-C | A1-P-Bk | THIRD SHEET (CHART 303) |
|---|---|---|---|---|---|---|---|---|---|---|---|---|---|---|---|---|---|---|---|---|---|---|
| CAMOUFLAGE PATTERN | W-Ca | D-Ca-Y | D-Ca-M | D-Ca-C | D-Ca-Bk | | | | | A1-Ca-Y | A1-Ca-M | A2-Ca-Y | A2-Ca-M | A2-Ca-C | A2-Ca-Bk | | | | | A1-Ca-C | A1-Ca-Bk | |
| CAMOUFLAGE PATTERN COLORS | | Y, M, C, Bk, MIXED COLORS | Y, M, C, Bk, MIXED COLORS | Y, M, C, Bk, MIXED COLORS | Y, M, C, Bk, MIXED COLORS | | | | | M | Y | C, Bk | C, Bk | Y, M | Y, M | | | | | Bk | C | |

FIG. 21B

| IMAGE PATTERN | W-P | D-P-Y | D-P-M | D-P-C | D-P-Bk | FIRST SHEET (CHART 301) | | | | A1-P-Y | A1-P-M | A2-P-Y | A2-P-M | A2-P-C | A2-P-Bk | SECOND SHEET (CHART 302') | | | | A1-P-C | A1-P-Bk | THIRD SHEET (CHART 303') |
|---|---|---|---|---|---|---|---|---|---|---|---|---|---|---|---|---|---|---|---|---|---|---|
| CAMOUFLAGE PATTERN | W-Ca | D-Ca-Y | D-Ca-M | D-Ca-C | D-Ca-Bk | | | | | A1-Ca-Y | A1-Ca-M | A2-Ca-Y | A2-Ca-M | A2-Ca-C | A2-Ca-Bk | | | | | A1-Ca-C | A1-Ca-Bk | |
| CAMOUFLAGE PATTERN COLORS | | Y, M, C, Bk, MIXED COLORS | Y, M, C, Bk, MIXED COLORS | Y, M, C, Bk, MIXED COLORS | Y, M, C, Bk, MIXED COLORS | | | | | M, C | Y, C | Bk | Bk | Y, M | Y, M, C | | | | | Bk | NONE | |

IMAGE FORMING APPARATUS FOR DETECTING CAUSAL PART OF STREAK OCCURRING AT TIME OF IMAGE FORMING

BACKGROUND OF THE INVENTION

Field of the Invention

The present invention relates to fault detection processing for detecting a causal part of a streak occurring at a time of image forming.

Description of the Related Art

When an image forming apparatus such as a printer is subject to use that applies stress over a long time, there is a possibility of a "fault image", which is an image different from a normal one due to degradation or the like of parts, occurring. Because it is difficult to auto-detect by sensors a "fault image" that occurs due to degradation or the like, there are many cases where these are identified by a user, and attempts to resolve the fault are made. Furthermore, it is difficult to describe a "fault image" with words. For example, if detailed information such as the color, direction, and size of a streak is not known, it is not possible to identify the cause of the streak. Accordingly, it is necessary for a service person to whom a user identified the "fault image" to directly confirm an output image that includes the "fault image". The service person must predict which part is faulty in the image forming apparatus, and first return to a service location, and then bring a unit that is to be replaced. With such an interaction, a cost is incurred by the travel of the service person. Furthermore, the user cannot use the image forming apparatus until the problem is resolved. Accordingly, the user's productivity will greatly decrease.

A technique for controlling an image forming apparatus to form a pattern image of a predetermined density on a sheet, causing a reader device to read the pattern image, and identifying a unit that needs replacement based on read data of the pattern image is known (Japanese Patent Laid-Open No. 2017-83544). The method recited in Japanese Patent Laid-Open No. 2017-83544 analyzes the read data to obtain the density of the streak or the position of the streak in the pattern image, and decides which unit the fault occurred in based on an analysis result.

SUMMARY OF THE INVENTION

The present invention provides an image forming apparatus comprising the following elements. A reader can read an original. A printer can form an image on a sheet based on a read result of the reader. A controller can control the printer to form a test chart on the sheet, the test chart is used for detecting a causal part of a streak that occurs when an image is formed by the printer, and control the reader to read the test chart. The test chart has a pattern for obscuring an image defect occurring when the test chart is formed by the printer.

Further features of the present invention will become apparent from the following description of exemplary embodiments (with reference to the attached drawings).

BRIEF DESCRIPTION OF THE DRAWINGS

FIG. 7 is a view for describing a relationship between types of streaks and replacement parts.

FIG. 14 is a flowchart for illustrating processing for generating a chart and processing for identifying a replacement part.

FIG. 15 is a view for describing an example of a message indicating a replacement part.

FIG. 18 is a view for describing parameters of a camouflage pattern.

FIG. 20 is a view for describing an arrangement of analog patterns.

FIGS. 21A and 21B are tables for describing toner colors that can be used for camouflage patterns.

DESCRIPTION OF THE EMBODIMENTS

First Embodiment

[Image Forming Apparatus]

Figure 1:
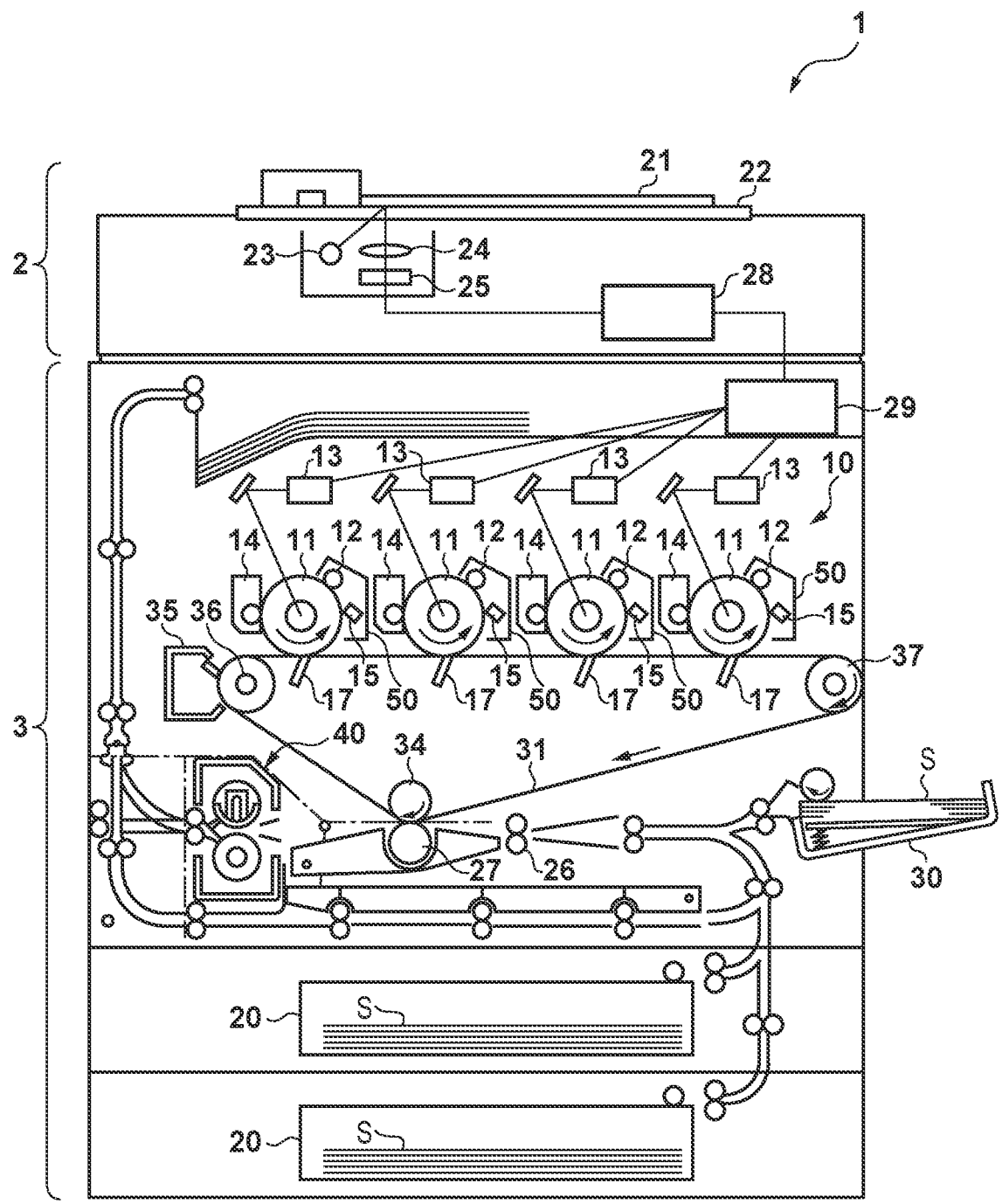
FIG. 1 is a view for describing an image forming apparatus.

FIG. 1 is an overview cross-sectional view of an image forming apparatus 1. The image forming apparatus 1 has an image reader 2 and a printer 3. The image reader 2 is a reader device for reading an original or a test chart. A light source 23 irradiates light on an original 21 placed on a platen glass 22. An optical system 24 guides and focuses light reflected from the original 21 to a CCD sensor 25. CCD is an abbreviation for charge-coupled device. The CCD sensor 25 generates color component signals for red, green, and blue. An image processing unit 28 executes image processing (for example: shading correction or the like) on the color component signals obtained by the CCD sensor 25 to generate image data. The image processing unit 28 transfers the image data to a printer control unit 29 of the printer 3.

The printer 3 forms toner images on a sheet S based on the image data. The printer 3 has an image forming device 10 for forming toner images of each color out of Y (yellow), M (magenta), C (cyan), and Bk (black). Note that the image forming device 10 is provided with an image forming station for forming a yellow image, an image forming station for forming a magenta image, an image forming station for forming a cyan image, and an image forming station for forming a black image. In addition, the printer 3 of the present invention is not limited to a color printer for forming a full-color image, and may be a monochrome printer for forming a monochrome image, for example. As illustrated by FIG. 1, the four image forming stations corresponding to each color of Y, M, C, Bk are arranged in order from the left side of the image forming device 10. The configurations of the four image forming station stations are all the same, and thus the image forming station for forming a black image is described here. The image forming station is provided with a photosensitive drum 11. A charger unit 12, an exposure unit 13, a developing unit 14, a primary transfer unit 17, and a drum cleaner 15 are arranged around the photosensitive drum 11. The charger unit 12 is provided with a charging roller for charging the surface potential of the photosensitive drum 11 to a predetermined charging potential. The exposure unit 13 is provided with a light source, a mirror, and a lens. The developing unit 14 is provided with a housing for housing a developing agent (toner), and a developing roller for carrying the developing agent in the housing. A developing voltage is applied to the developing roller. The primary transfer unit 17 is provided with a transfer blade to which a transfer bias (primary) is supplied. Note that configuration may be such that the primary transfer unit 17 is provided with a transfer roller instead of a transfer blade. The drum cleaner 15 is provided with a cleaning blade for removing toner from the surface of the photosensitive drum 11.

Next, a process in which the black image forming station forms a toner image is described. Note that because processes in which image forming stations for colors other than black form toner images are similar processes, description thereof is omitted here. When image formation is started, the photosensitive drum 11 rotates in the arrow symbol direction. The charger unit 12 causes a front surface of the photosensitive drum 11 to be charged uniformly. The exposure unit 13 exposes the surface of the photosensitive drum 11 based on image data outputted from the printer control unit 29. Thereby, an electrostatic latent image is formed on the photosensitive drum 11. The developing unit 14 develops the electrostatic latent image using toner to form a toner image. The primary transfer unit 17 transfers the toner image carried on the photosensitive drum 11 to an intermediate transfer belt 31. The intermediate transfer belt 31 functions as an intermediate transfer member to which the toner image is transferred. The intermediate transfer belt 31 is turned by three rollers 34, 36, and 37. The drum cleaner 15 removes toner remaining on the photosensitive drum 11 that was not transferred to the intermediate transfer belt 31 by the primary transfer unit 17.

Sheets S are stacked on a feeding cassette 20 or a multi-feed tray 30. Feeding rollers feed a sheet S from the feeding cassette 20 or the multi-feed tray 30. A sheet S fed by the feeding roller is conveyed toward registration rollers 26 by conveyance rollers. The registration rollers 26 convey the sheet S to a transferring nip portion between the intermediate transfer belt 31 and a secondary transfer unit 27 so that the toner image on the intermediate transfer belt 31 is transferred to the sheet S. The secondary transfer unit 27 is provided with a secondary transfer roller to which a (secondary) transfer bias is supplied. The secondary transfer unit 27 transfers the toner image on the intermediate transfer belt 31 to the sheet S at the transferring nip portion. A transfer cleaner 35 is provided with a cleaning blade for removing toner from the surface of the intermediate transfer belt 31. The transfer cleaner 35 removes toner remaining on the intermediate transfer belt 31 that was not transferred to the sheet S at the transferring nip portion. A fixing device 40 is provided with a heating roller having a heater and a pressure roller for pressing the sheet S to the heating roller. A fixing nip portion for fixing the toner image to the sheet S is formed between the heating roller and the pressure roller. The sheet S to which the toner image has been transferred passes through the fixing nip portion. The fixing device 40 uses the heat of the heating roller and the pressure of the fixing nip portion to fix the toner image to the sheet S.

[Replacement Part]

The photosensitive drum 11, the charger unit 12, and the drum cleaner 15 provided in the printer 3 of the present embodiment are integrated as one process cartridge 50. The process cartridge 50 can be attached/released with respect to the printer 3. As a result, a user or a service person can easily replace the photosensitive drum 11, the charger unit 12, and the drum cleaner 15. In addition, the developing unit 14 can also be attached/released with respect to the printer 3. Furthermore, the primary transfer unit 17 and the intermediate transfer belt 31 are integrated as a transfer cartridge. The transfer cartridge can also be attached/released with respect to the printer 3. As a result, a user or a service person can easily replace the primary transfer unit 17 and the intermediate transfer belt 31. Note that the transfer cleaner 35 may also be made capable of being attached/released with respect to the printer 3. Replacement parts of the present embodiment are the process cartridge 50, the developing unit 14 and a transfer cartridge.

[Control System]

Figure 2:
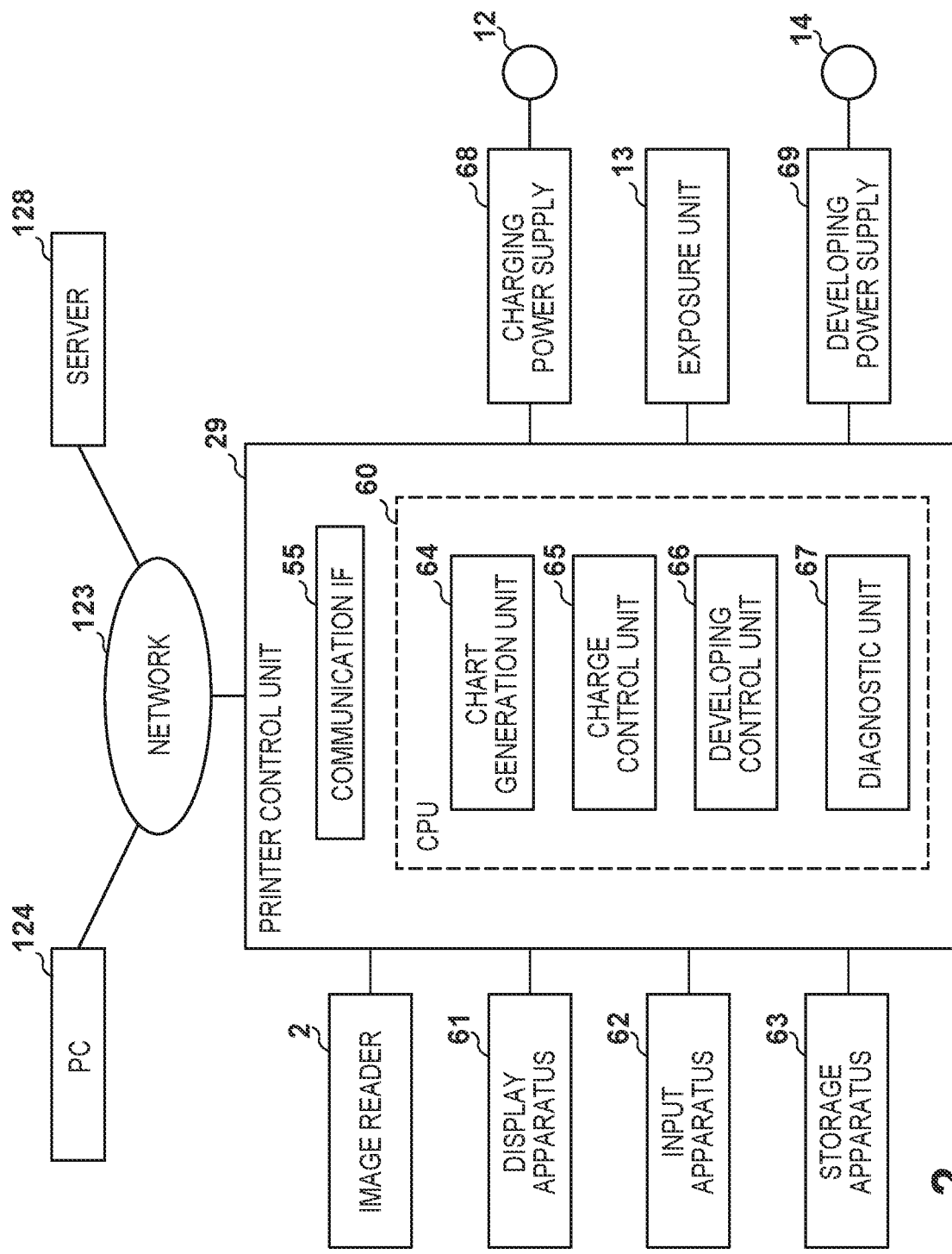
FIG. 2 is a view for describing a control system.

FIG. 2 illustrates a control system of the image forming apparatus 1. The image forming apparatus 1 can be connected via a network to an external device such as a PC 124 or a server 128, via a network 123. PC is an abbreviation for personal computer. The printer control unit 29 controls the image reader 2 and the printer 3. The printer control unit 29 may be separated into an image processing unit for executing image processing, and a device control unit for controlling the image reader 2 and the printer 3. A communication IF 55 is a communication circuit for receiving image data transferred from an external device (the PC 124 or the server 128) connected via a network, or transmitting various pieces of data from the image forming apparatus 1 to an external device (the PC 124 or the server 128). A CPU 60 is a control circuit for comprehensively controlling each unit of the image forming apparatus 1. The CPU 60 realizes each kind of function by executing control programs stored in a storage apparatus 63. Note that some or all of the functions of the CPU 60 may be realized by hardware such as an ASIC, an FPGA or the like. ASIC is an abbreviation for application specific integrated circuit. FPGA is an abbreviation for field-programmable gate array. A display apparatus 61 is provided with a display for displaying various pieces of information such as a message, an image, or a moving image. An input apparatus 62 is provided with a numeric keypad, a start key, a stop key, and a read start button. The storage apparatus 63 encompasses a memory such as a ROM or a RAM, or a bulk storage unit such as a hard disk drive. The CPU 60 performs image processing (data conversion processing, tone correction processing) on image data transferred from an external device or the image reader 2. The CPU 60 outputs the image data to which image processing has been performed to the exposure unit 13.

The CPU 60 realizes various functions, but a representative function related to the present embodiment is described here. A chart generation unit 64 controls the printer 3 to form a test image for identifying a replacement part on a sheet S. In the following description, a sheet S on which a test image is formed is referred to as a test chart or simply as a chart. Note that image data (pattern image data) for forming a test image is stored in the storage apparatus 63. A charge control unit 65 controls a charging power supply 68 to apply a charging voltage to the charger unit 12. A developing control unit 66 controls a developing power supply 69 to apply a developing voltage to the developing unit 14. A diagnostic unit 67 obtains a read result (read data) of a chart read by the image reader 2, and determines a causal part of a streak based on the read data. Furthermore, the diagnostic unit 67 identifies a replacement part based on a result of determining the causal part of the streak.

[Chart]

When a replacement time period is reached for a process cartridge 50, a developing unit 14, or the like, a vertical streak occurs in an output image. A vertical streak is a straight line image that extends parallel to a conveyance direction of the sheet S. The diagnostic unit 67 analyzes read data of a test image outputted from the image reader 2, and identifies a replacement part based on the density of the streak or the position of the streak that occurred in the test image. A test chart of the present embodiment is described below.

The size of the test chart is assumed to be an A4 size (widthwise length 297 mm, conveyance-direction length 210 mm), for example. Note that the size of a test chart is not limited to the A4 size, and may be another size. In addition, the image forming apparatus 1 of the present embodiment outputs three test charts, for example, to determine the causal part of a streak. However, the number of test charts may be one and may be a plurality of sheets, that is two or more.

Figure 3:
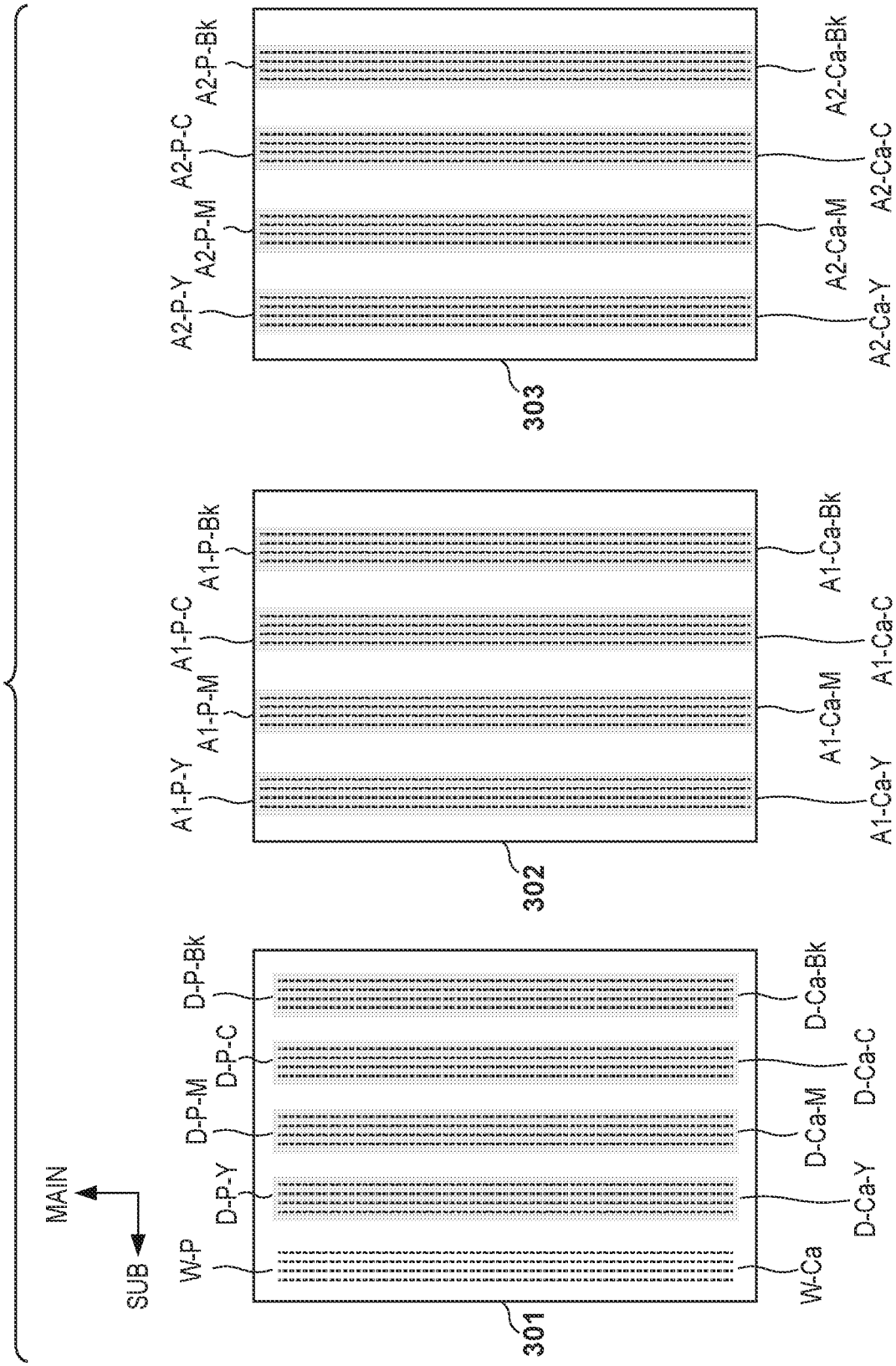
FIG. 3 is a view for describing a chart.

FIG. 3 is a schematic view of three charts 301, 302, and 303 printed by the printer 3. The charts 301, 302, and 303 have a plain region W-P, digital patterns D-P, and two types of analog patterns A1-P and A2-P. In the following description, the digital patterns D-P and the two types of analog patterns A1-P and A2-P are referred to as image patterns. In addition, in the following description the plain region W-P is referred to as a plain pattern. Image patterns D-P-Y, A1-P-Y, and A2-P-Y are formed using yellow toner. Image patterns D-P-M, A1-P-M, and A2-P-M are formed using magenta toner. Image patterns D-P-C, A1-P-C, and A2-P-C are formed using cyan toner. Image patterns D-P-Bk, A1-P-Bk, and A2-P-Bk are formed using black toner.

The length of each image pattern in the conveyance direction of the test charts is 30 mm, for example. Note that the external diameter of a photosensitive drum 11 is 30 mm. An outer circumference of the photosensitive drum 11 is approximately 94.2 mm.

When the printer 3 forms the digital patterns D-P, the exposure unit 13 exposes the photosensitive drum 11. In other words, the digital patterns D-P are exposure images (toner images). The absolute value of the developing potential of the developing unit 14 is larger than the absolute value of the potential of an exposure region (a bright portion) in the photosensitive drum 11. Note that the absolute value of the developing potential of the developing unit 14 is smaller than the absolute value of the potential of an exposure region (a dark portion) in the photosensitive drum 11. The relationship of potentials described above is the same as the relationship of potentials in a case where the printer 3 copies an original, for example. In contrast, when the printer 3 forms the analog patterns A1-P and A2-P the exposure unit 13 does not expose the photosensitive drum 11. In other words, the analog patterns A1-P are non-exposure images (toner images). In order to cause toner to adhere to the photosensitive drum 11, the absolute value of the developing potential of the developing unit 14 is larger than the absolute value of the surface potential of the photosensitive drum 11.

Camouflage Pattern

Camouflage patterns are formed on image patterns and the plain pattern. A camouflage pattern is a pattern for obscuring an image defect that occurs on the test chart. In the present embodiment a camouflage pattern is formed on both of the image patterns and the plain pattern, but the present invention is not limited to this configuration. For example, a configuration in which a camouflage pattern is formed on image patterns and a camouflage pattern is not formed on plain patterns may be employed. In addition, the present invention is not limited to a configuration where a camouflage pattern is formed on all image patterns. For example, a configuration in which a camouflage pattern is not formed on an image pattern for yellow which it difficult to identify with visual observation, and a camouflage pattern is formed on image patterns of other colors (magenta, cyan, and black) may be employed. An image pattern on which a camouflage pattern is formed corresponds to a pattern image for detecting a causal part of a streak.

A camouflage pattern W-Ca is formed on the plain region W-P. The digital patterns D-P have camouflage patterns D-Ca. The analog patterns A1-P have camouflage patterns A1-Ca. The analog patterns A2-P have camouflage patterns A2-Ca. Note that letters of Y, M, C, Bk added to the end of reference symbols indicating camouflage patterns indicate the color of the image pattern. For example, the digital pattern D-P-Y is formed using yellow toner. The digital pattern D-P-Y which is formed by yellow toner has a camouflage pattern D-Ca-Y. Here, the camouflage pattern D-Ca-Y is a blue camouflage pattern formed using cyan toner and magenta toner, for example. Alternatively, the camouflage pattern D-Ca-Y may be a yellow camouflage pattern formed using yellow toner, for example. The density of the camouflage pattern D-Ca-Y differs from the density of the digital pattern D-P-Y. Alternatively the camouflage pattern D-Ca-Y may be a pattern that blanks the digital pattern D-P-Y. A blanked region out of an image pattern is referred to as a blank region. In other words, an image pattern on which a camouflage pattern is formed is an image pattern for which a pattern is formed so that a predetermined pattern image is thinned. A camouflage pattern formed on an analog pattern may also be a pattern of a color different from the analog pattern, or may be a pattern whose density is different from that of the analog pattern. The camouflage pattern may be a pattern so that another image defect different from an image defect for identifying a replacement part is obscured.

A definition of camouflage is described here. Conventionally, a technique where text or an image hidden in a copy of an original appears in order to prevent forgery of the original is known. With this technique, text or an image that is difficult for a human eye to distinguish is formed on an original. The text or image that appears on a copy of the original corresponds to a camouflage pattern. In a macro sense, differences between a camouflage pattern and an image portion or differences between a camouflage pattern and a background portion where toner has not adhered are emphasized over differences between an image portion other than a camouflage pattern and a background portion. Accordingly, because the camouflage pattern will be relatively noticeable, the image portion or an outline of the image portion will be relatively obscured.

Figure 4:
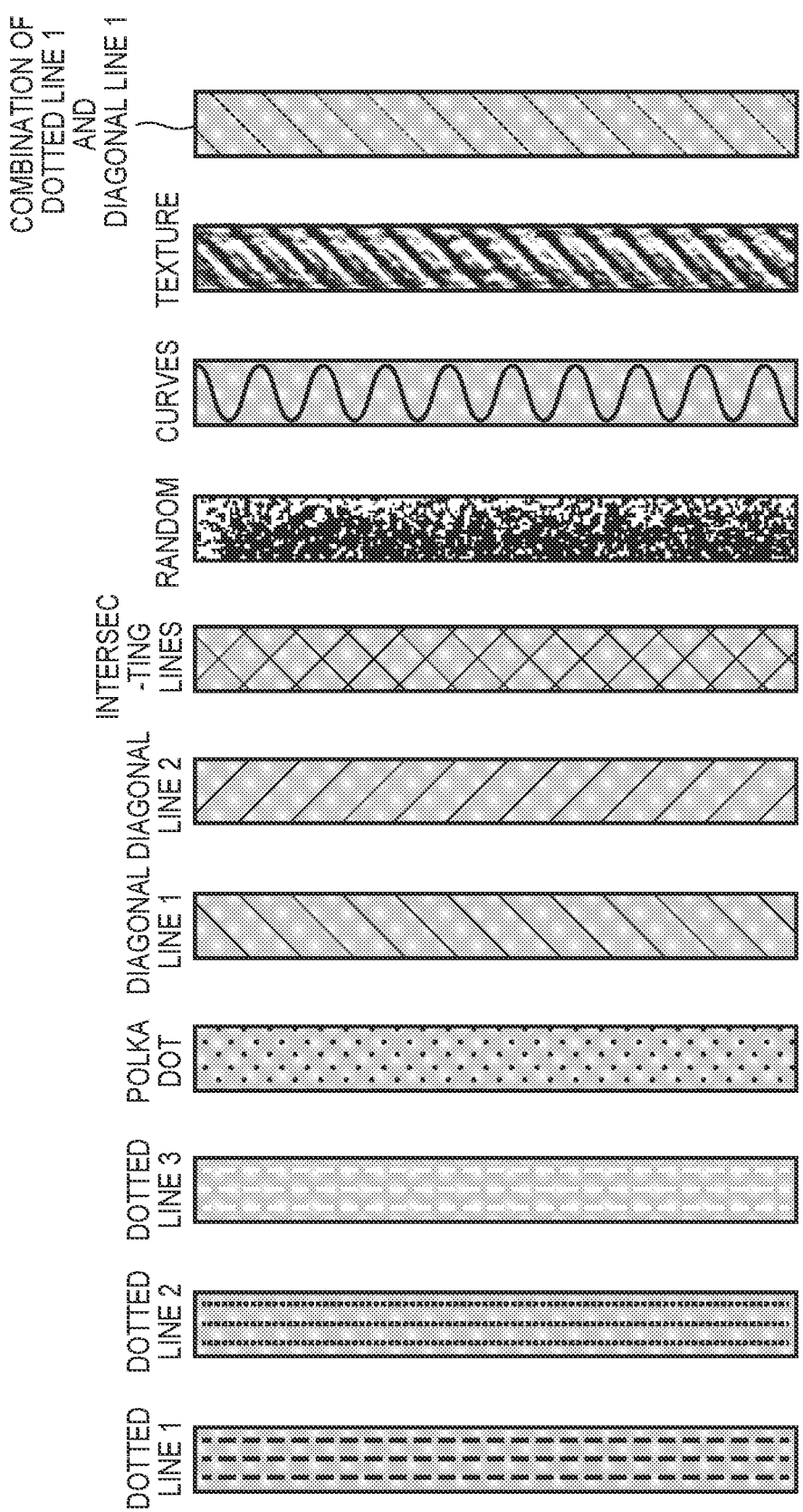
FIG. 4 is a view for describing a camouflage pattern.

FIG. 4 exemplifies various camouflage patterns added to image patterns. These are merely examples of camouflage patterns, and may be other patterns in the case of a pattern that obscures an image defect of an image pattern (a test image). Typically, an image pattern is formed based on a predetermined image signal value so that a density of the image pattern becomes a predetermined density. This is to cause an image defect to be apparent. A camouflage pattern is a specific pattern that is arranged regularly. For an image signal value for forming the specific pattern, an image signal value different from the predetermined image signal value is set, for example. As a result, the density of the specific pattern is different from the density of the image pattern (the predetermined density). In addition, the camouflage pattern is not limited to a regular specific patterns, and may be a random pattern.

A camouflage pattern may be any of dotted line 1, dotted line 2, dotted line 3, polka dots, diagonal line 1, diagonal line 2, or intersecting lines. In addition, a camouflage pattern may be a diagonal dotted line pattern that combines dotted line 1 and diagonal line 1, for example. As parameters for defining a camouflage pattern, there are line intervals, dot intervals, line thickness, line density, contrast between lines and image pattern, or the like. In addition, for a random pattern, a difference in density between the image pattern and the camouflage pattern and the shape of the pattern can be freely set. In addition, an image frequency of a random pattern can also be freely set.

A camouflage pattern is not limited to a geometric pattern. A camouflage pattern may be a pattern that causes a viewer to envision an image such as marble or a blue sky, and is referred to as a texture pattern, for example. A texture pattern uses changes in a color difference, a brightness difference and a density difference between a high density region and a low density region to obscure an image defect of a chart.

Figure 5:
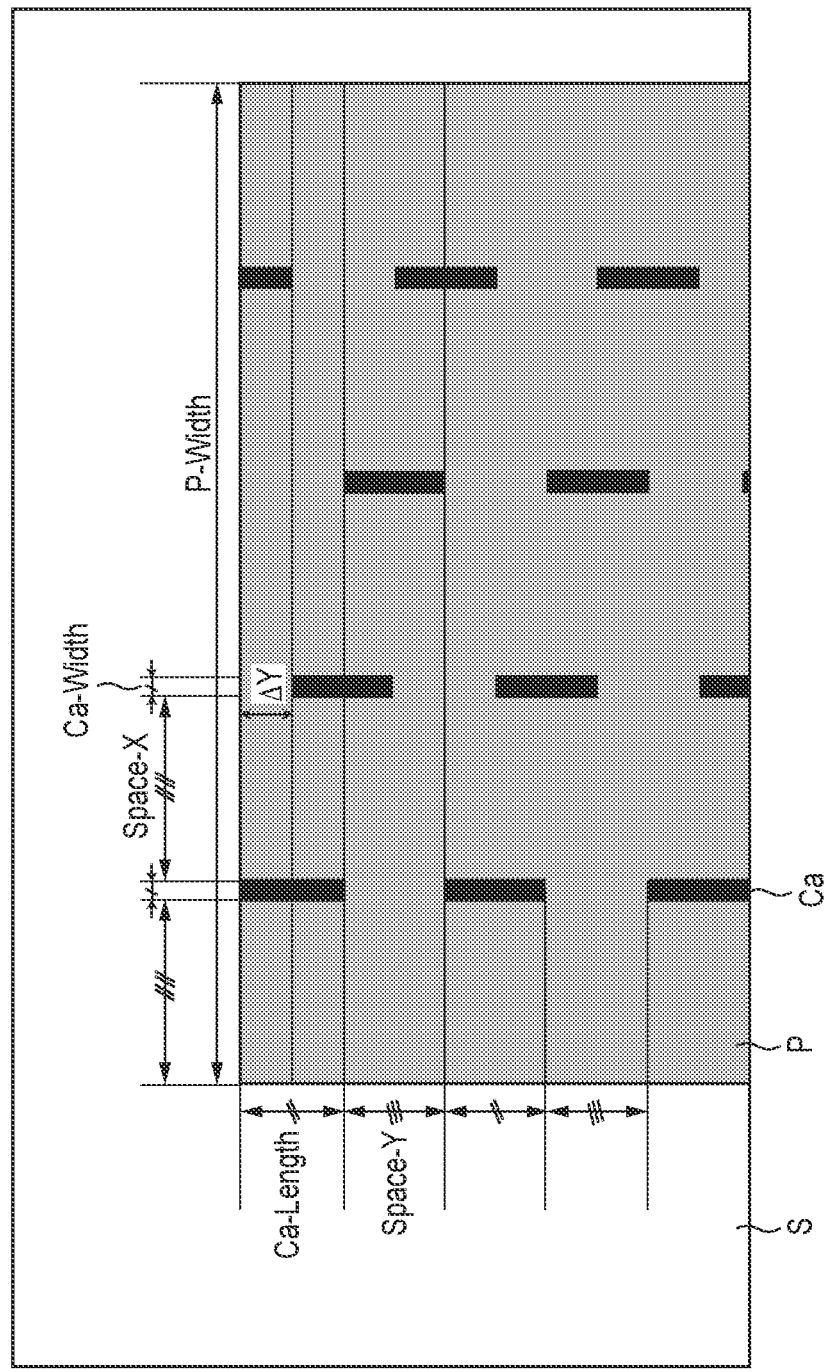
FIG. 5 is a view for describing a camouflage pattern.

FIG. 5 is an enlarged view of an image pattern on which a camouflage pattern is formed. In the image pattern illustrated in FIG. 5, a camouflage pattern Ca corresponding to dotted line 1 is formed with respect to an image pattern P. The width of the image pattern (P-Width) is 30 [mm]. The camouflage pattern Ca is configured from a plurality of rectangular patterns. A distance (Space-X) between two rectangular patterns adjacent in the X direction (a sub scanning direction) is 1.8 [mm]. A distance (Space-Y) between two rectangular patterns adjacent in the Y direction (a main scanning direction) is 0.7 [mm]. Note that the X direction (the sub scanning direction) is parallel to the conveyance direction of the sheet S, and is orthogonal to the Y direction (a main scanning direction). The width of the rectangular pattern (Ca-Width) is 0.25 [mm]. The length of the rectangular pattern (Ca-Length) is 0.7 [mm]. The width Ca-Width and the length Ca-Length may be 0.1 [mm] or more in order to make the camouflage pattern stand out visually. As the width Ca-Width and the length Ca-Length increase, a camouflage effect increases. However, when the camouflage effect increases, the area of a vertical streak detection region decreases. For this reason, the width Ca-Width and the length Ca-Length of the rectangular pattern are decided so that it is possible to detect a vertical streak from read data of a test image on which rectangular patterns are formed. From experimentation, it is possible to detect a vertical streak from read data if the width Ca-Width and the length Ca-Length were less than or equal to 5.0 [mm].

A vertical streak is an image defect for identifying a replacement part. As illustrated in FIG. 5, two rectangular patterns adjacent in the X direction are shifted by a predetermined amount ΔY in the Y direction. ΔY is 0.3 [mm], for example. A longer side direction of the rectangular pattern is orthogonal with the X direction (the sub scanning direction). In other words, the longer side direction of the rectangular pattern and the longer side direction of a vertical streak differ. As a result, an increase of the camouflage effect, and a decrease of the area of a vertical streak detection region is suppressed. The distance Space-X between rectangular patterns in the X direction and the distance Space-Y between rectangular patterns in the Y direction are decided to be distances having high sensitivity with respect to vision characteristics of a human. However, as the distance Space-X and the distance Space-Y shorten, the area of a vertical streak detection region decreases. For this reason, the distances Space-X and Space-Y are decided so that it is possible to detect a vertical streak from read data of a chart on which rectangular patterns are formed.

The color of the camouflage pattern Ca is set so that a color difference ΔE00 in visual observation is 3.0 or more with respect to a digital pattern D-P or an analog pattern A-P. As the color difference ΔE00 increases, the camouflage effect also increases.

Digital Patterns

Figure 6A:
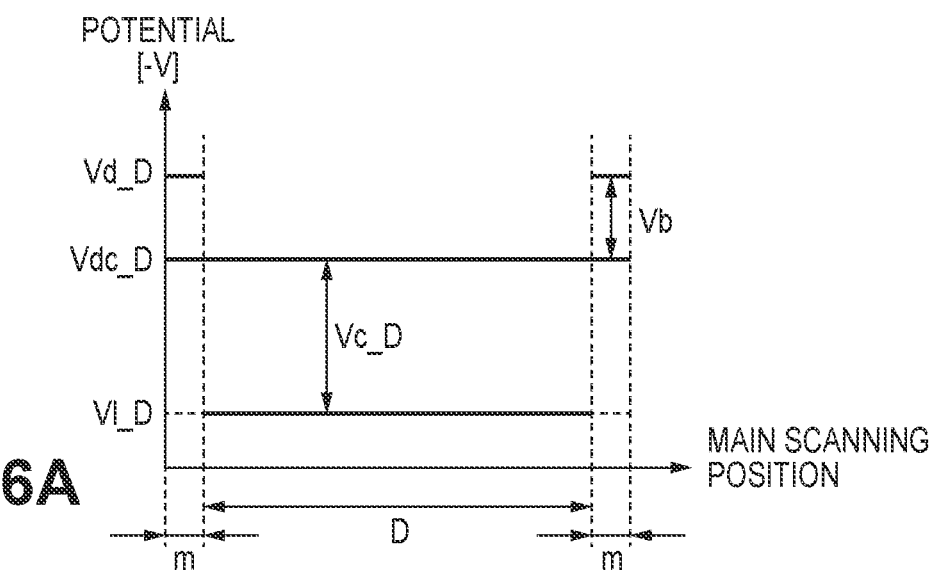
FIGS. 6A to 6F are views for describing a relationship among latent image potential, charging potential, and developing potential.
Figure 6B:
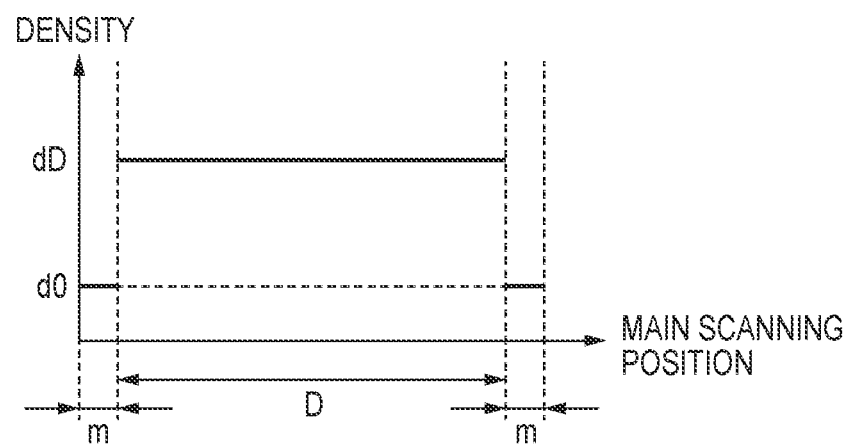

FIG. 6A illustrates the potential of each position in the Y direction on the photosensitive drum 11 in a case where the printer 3 forms a digital pattern D. In FIG. 6A, the potential of a position where the camouflage pattern Ca of the photosensitive drum 11 is formed is omitted. FIG. 6B illustrates a density dD of the digital pattern D-P formed on the sheet S, and a density d0 of a plain region W-P. The density d0 is an optical density of a non-image forming region on the sheet S.

The charge control unit 65 controls the charging power supply 68 so that the surface potential of the photosensitive drum 11, which is charged by the charger unit 12, becomes a potential Vd_D. The exposure unit 13 exposes the photosensitive drum 11 based on the pattern image data. As a result, the potential of the exposure region of the photosensitive drum 11 (a light portion potential) changes to Vl_D. Note that the potential of a non-exposure region of the photosensitive drum 11 (a dark portion potential) is maintained at Vd_D. The developing control unit 66 controls the developing power supply 69 so that the potential of the developing sleeve of the developing unit 14 becomes a developing potential Vdc_D. Note that the developing potential is also referred to as a developing bias. The developing potential Vdc_D is set between a dark portion potential Vd_D and the light portion potential Vl_D. A potential difference Vb corresponds to a potential difference between the developing potential Vdc_D and the dark portion potential Vd_D. As a result, toner does not adhere to a margin region. An image signal value of the pattern image data is decided in advance so that the optical density dD of the digital pattern D becomes 0.6, for example. The optical density dD of the digital pattern D may be any density if it is a density that makes it easy to detect a vertical streak. The image signal value of the digital pattern D is 50%, for example.

Analog Pattern

Figure 6C:
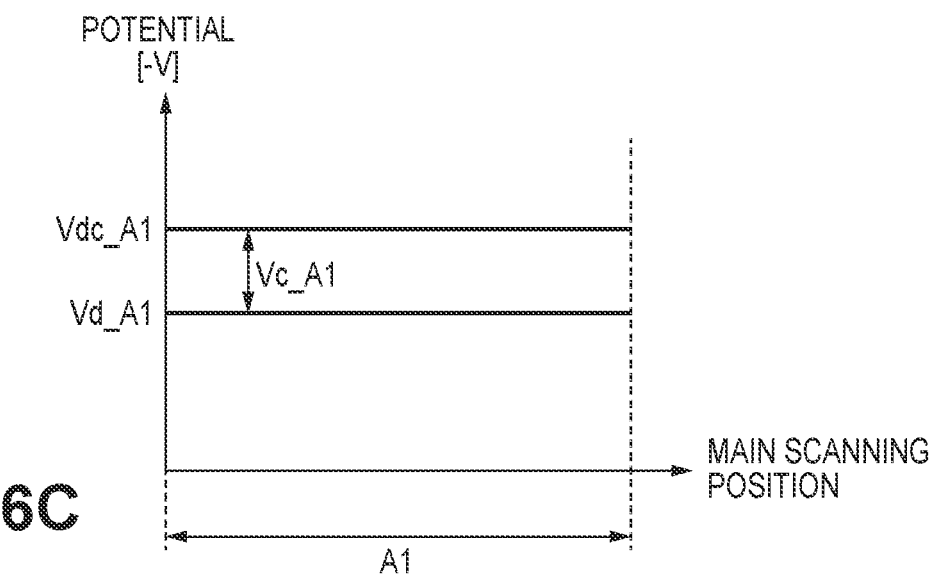
Figure 6D:
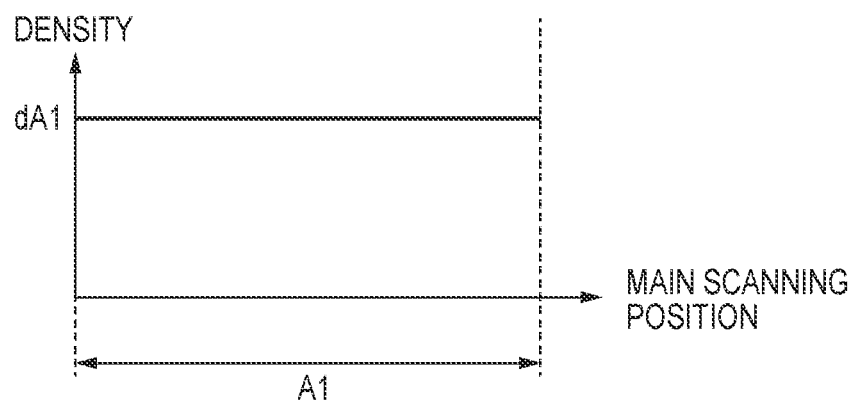

FIG. 6C illustrates the potential of each position in the Y direction on the photosensitive drum 11 in a case where the printer 3 forms a first analog pattern A1-P. In FIG. 6C, the potential of a position where the camouflage pattern Ca of the photosensitive drum 11 is formed is omitted. FIG. 6D illustrates a density dA1 of an analog pattern A1-P formed on the sheet S.

The charge control unit 65 controls the charging power supply 68 so that the surface potential of the photosensitive drum 11, which is charged by the charger unit 12, becomes a first charging potential Vd_A1. The developing control unit 66 controls the developing power supply 69 so that the potential of the developing sleeve of the developing unit 14 becomes a developing potential Vdc_A1. An absolute value of the developing potential Vdc_A1 is larger than an absolute value of a charging potential Vd_A1. In the example illustrated in FIG. 6C, when the analog pattern A1-P is formed, the exposure unit 13 does not irradiate a laser beam onto the photosensitive drum 11. As illustrated by FIG. 6C, a potential difference Vc_A1 (a development contrast Vc_A1) arises between the photosensitive drum 11 and the developing sleeve. By this, the analog pattern A1-P is formed on the photosensitive drum 11. Note that margins are not formed on the two sides of the analog pattern A1-P. In addition, because the photosensitive drum 11 is not exposed, the density of the analog pattern A1-P is decided based on the development contrast Vc_A1. An optical density dA1 of the analog pattern A1 is 0.6, for example. The CPU 60 controls the developing control unit 66 and the developing power supply 69 to adjust the development contrast Vc_A1. As illustrated by FIG. 6D, an analog pattern A1 of the optical density dA1 (=0.6) is formed on the sheet S.

Figure 6E:
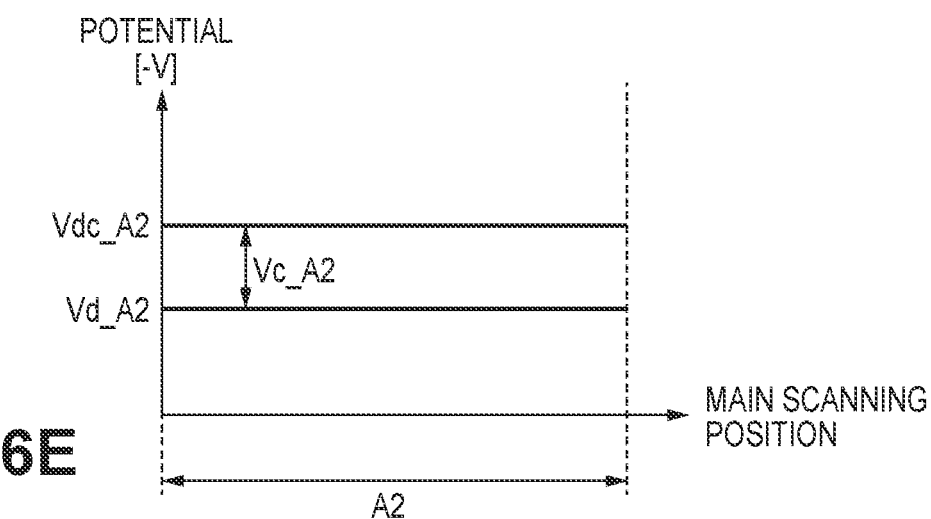

FIG. 6E illustrates the potential of each position in the Y direction on the photosensitive drum 11 in a case where the printer 3 forms a second analog pattern A2-P. In FIG. 6E, the potential of a position where the camouflage pattern Ca of the photosensitive drum 11 is formed is omitted.

Figure 6F:
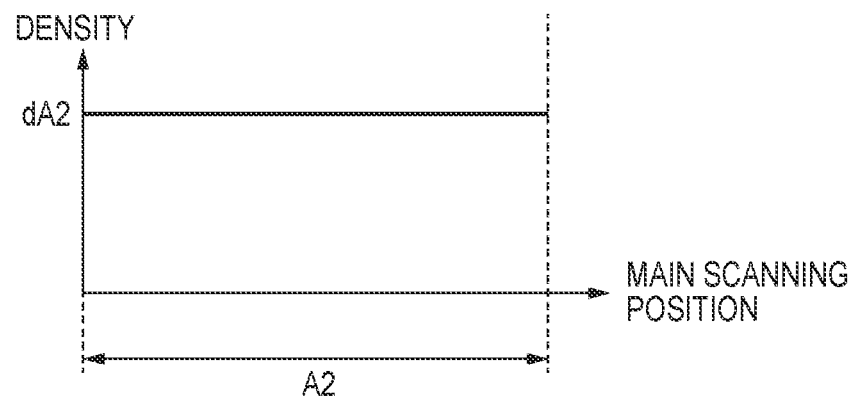

FIG. 6F illustrates a density dA2 of an analog pattern A2-P formed on the sheet S. The charge control unit 65 controls the charging power supply 68 so that the potential of the surface of the photosensitive drum 11 becomes a second charging potential Vd_A2. The developing control unit 66 controls the developing power supply 69 so that the potential of the developing sleeve of the developing unit 14 becomes a developing potential Vdc_A2. An absolute value of the developing potential Vdc_A2 is larger than an absolute value of a charging potential Vd_A2. In the example illustrated in FIG. 6E, when the analog pattern A2-P is formed, the exposure unit 13 does not irradiate a laser beam. As illustrated by FIG. 6F, a development contrast Vc_A2 arises between the photosensitive drum 11 and the developing sleeve. By this, the analog pattern A2-P is formed on the photosensitive drum 11. Margins are not formed on the two sides of the analog pattern A2-P. In addition, because exposure of the photosensitive drum 11 is not applied, the density of the analog pattern A2-P is decided based on the development contrast Vc_A2. An optical density dA2 of the analog pattern A1 is 0.6, for example. The CPU 60 controls the developing control unit 66 and the developing power supply 69 to adjust the development contrast Vc_A2. As illustrated by FIG. 6F, an analog pattern A2 of the optical density dA2 (=0.6) is formed on the sheet S.

Here, the second charging potential Vd_A2 for forming the analog pattern A2-P is set lower than the first charging potential Vd_A1 for forming the analog pattern A1-P (|Vd_A1|>|Vd_A2|). As a result, a contribution rate of the charger unit 12 with respect to an image defect decreases for the analog pattern A2-P in comparison to the analog pattern A1-P. This is because the diagnostic unit 67 compares streaks occurring with the analog pattern A1-P and the analog pattern A2-P to determine whether a streak causal part is the charger unit 12 or the developing unit 14. In addition the development contrast Vc_A1 of an analog pattern A1 and the development contrast Vc_A2 of an analog pattern A2 are the same. Accordingly, the optical density of the analog pattern A1-P and the optical density of the analog pattern A2-P are the same. However, the development contrast Vc_A1 of an analog pattern A1 and the development contrast Vc_A2 of an analog pattern A2 may differ.

For the above description, image forming conditions are controlled so that the optical density dD of the digital pattern D-P, the optical density dA1 of the analog pattern A1-P, and the optical density dA2 of the analog pattern A2-P become a predetermined density. However, the optical density dD of the digital pattern D-P, the optical density dA1 of the analog pattern A1-P, and the optical density dA2 of the analog pattern A2-P may each be different densities. However, in this case the densities of the streaks that occur for each image pattern differ. In a case of having this configuration, the diagnostic unit 67 corrects the density of the streak occurring in each image pattern to determine the causal part of the streak.

[Vertical Streak]

Using FIG. 7, vertical streaks that occur in a chart of the present embodiment are described. FIG. 7 indicates vertical streak types, a replacement part or response method, a state of a plain region W-P, the color of the pattern where a streak occurs, the existence or absence of the occurrence of a streak for each of a digital pattern and an analog pattern, and an impact of reducing a charging potential for an analog pattern. Note that a streak whose optical density is thinner than a predetermined density (0.6) is referred to as a white streak, and a streak whose optical density is thicker than the predetermined density (0.6) is referred to as a black streak.

A Streak Caused by a Developing Coat Defect

Figure 8A:
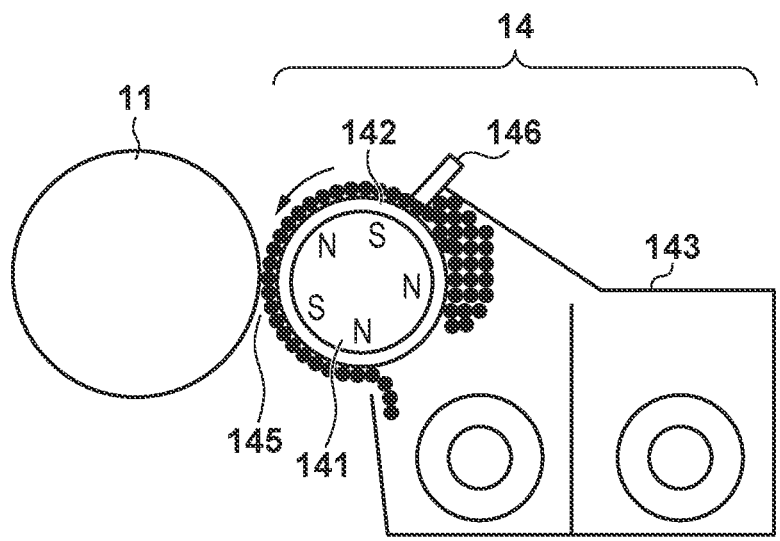
FIGS. 8A to 8C are views for describing a defect of a developing coat.
Figure 8B:
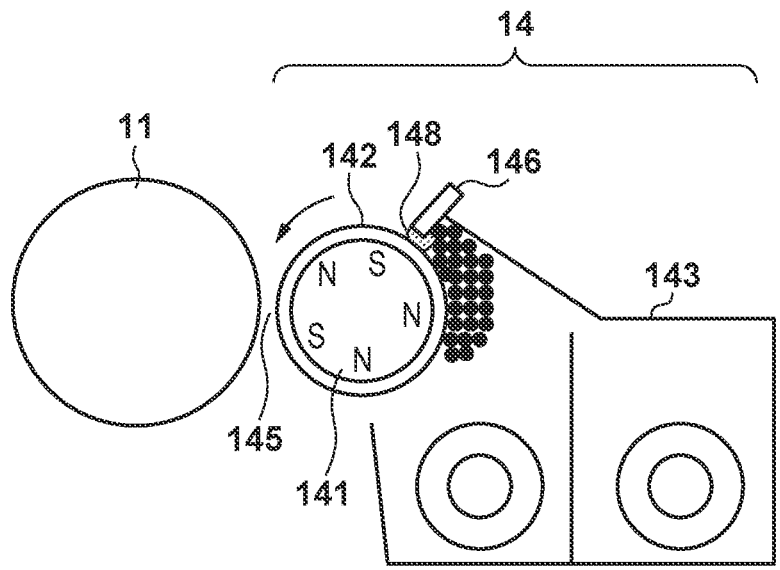

A developing coat defect streak indicated in FIG. 7 is a vertical streak that occurs because a developing coat is insufficient. FIG. 8A and FIG. 8B are views for describing a cause for a streak occurring due to a developing coat defect. The developing coat means that a developing agent is caused to adhere to the front surface of a developing sleeve 142 at a uniform thickness. A magnet 141 functioning as a developing agent carrier is provided inside the developing sleeve 142. The developing sleeve 142 is supported by a developing container 143 to be able to rotate freely. A closest part 145 is a part at which the distance between the developing sleeve 142 and the photosensitive drum 11 is the closest. In the rotation direction of the developing sleeve 142, a regulation blade 146 is provided upstream of the closest part 145. The regulation blade 146 is arranged so that the distance in relation to the developing sleeve 142 is fixed, and regulates the amount of two-component developing agent supplied to the closest part 145.

Figure 8C:
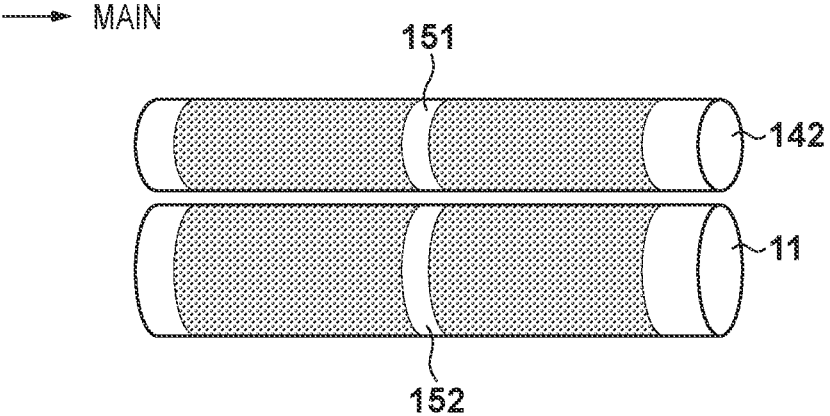

As illustrated by FIG. 8B, a foreign particle 148 such as dust or a hair may be clogged between the developing sleeve 142 and the regulation blade 146. In such a case, the foreign particle 148 impedes flow of the developing agent. As illustrated by FIG. 8C, a vertical streak 151 where developing agent is not carried occurs on the developing sleeve 142. The developing agent is not supplied to the part facing the vertical streak 151 in the front surface of the photosensitive drum 11 because there is no developing agent in the vertical streak 151. Therefore, a vertical streak 152 is such that a straight line which continues on the surface of the photosensitive drum 11 occurs. As indicated by FIG. 7, the unit to replace in order to resolve such a developing coat defect streak is the developing unit 14.

Furthermore, characteristics of a white streak that occurs due to a developing coat defect are described using FIG. 7. Firstly, a streak does not occur in a plain region W-P where an image pattern is not formed. Also, a color for which a streak occurs is only the color of the developing unit for which the developing coat defect occurred.

Figure 9A:
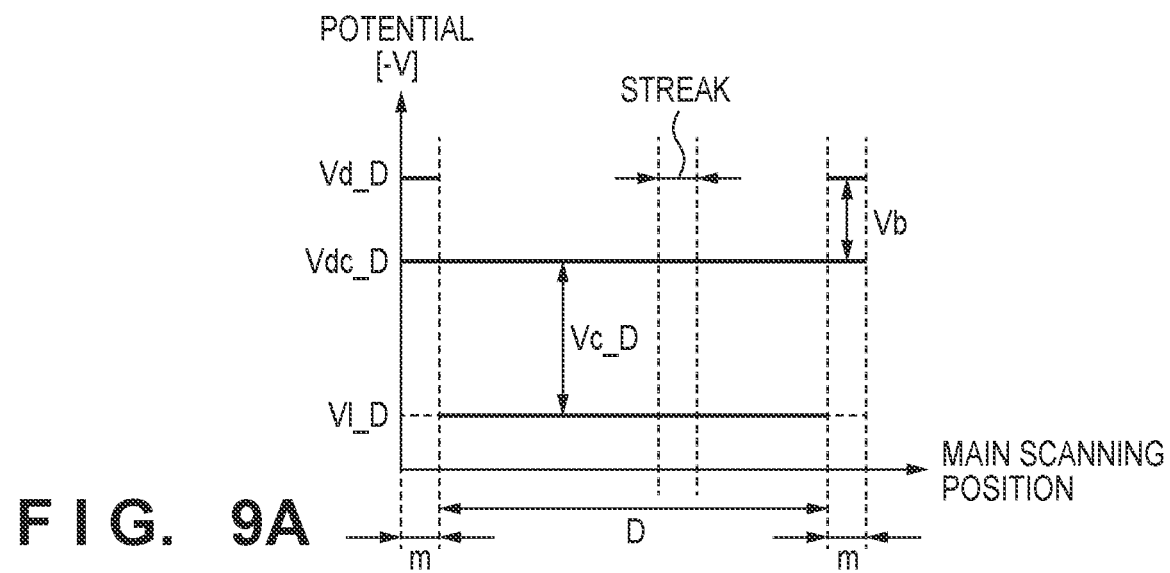
FIGS. 9A to 9F are views for describing a relationship among streaks, latent image potential, charging potential, and developing potential.
Figure 9B:
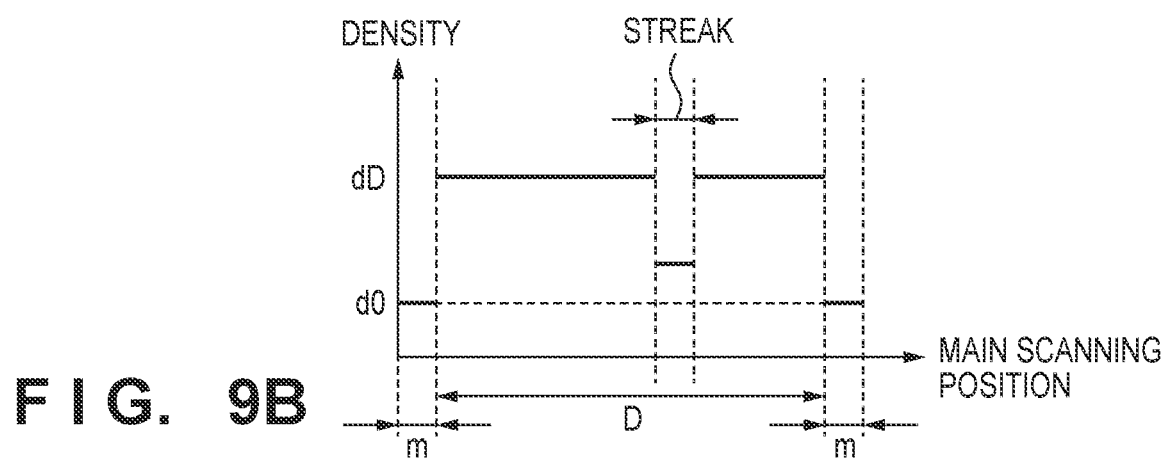
Figure 9C:
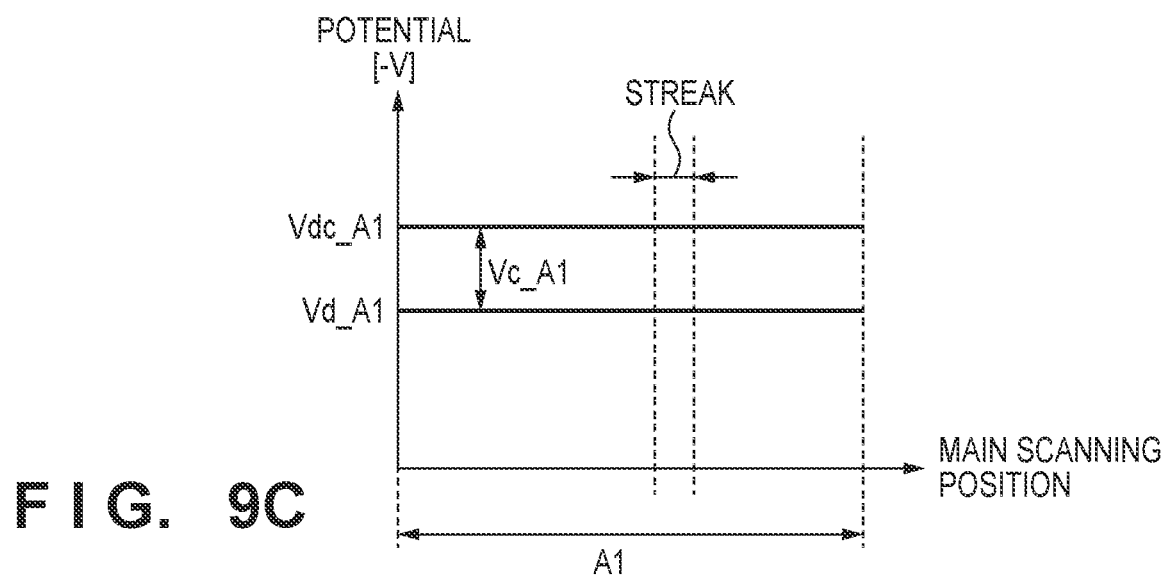
Figure 9D:
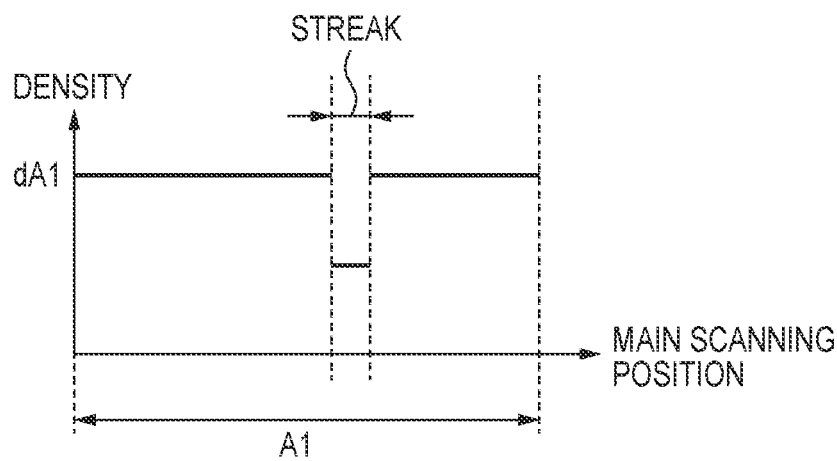
Figure 9E:
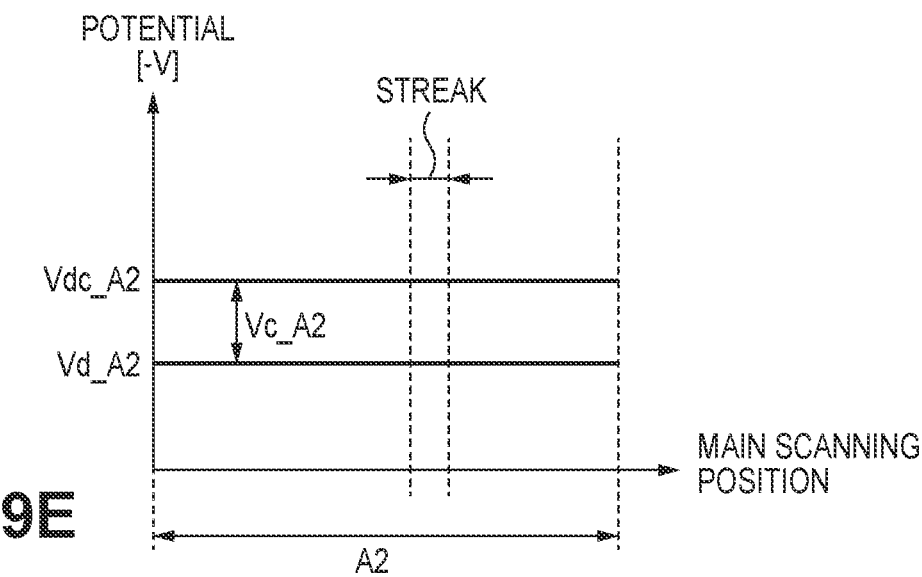
Figure 9F:
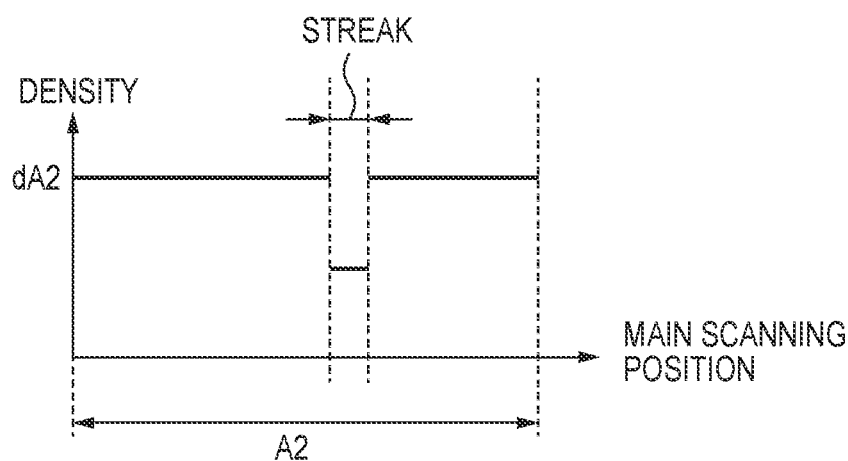

FIG. 9A illustrates potentials at each main scanning position of the photosensitive drum 11 when a digital pattern D-P is formed. FIG. 9B illustrates optical density at each main scanning position of a sheet S when the digital pattern D-P is formed. FIG. 9C illustrates potentials at each main scanning position of the photosensitive drum 11 when an analog pattern A1-P is formed. FIG. 9D illustrates optical density at each main scanning position of a sheet S when an analog pattern A1-P is formed. FIG. 9E illustrates potentials at each main scanning position of the photosensitive drum 11 when an analog pattern A2-P is formed. FIG. 9F illustrates optical density at each main scanning position of a sheet S when an analog pattern A2-P is formed. As these illustrate, a developing coat defect streak is due to developing agent not being supplied onto the developing sleeve 142. Accordingly, a vertical streak occurs for all of the digital pattern D-P, the analog pattern A1-P, and the analog pattern A2-P. Furthermore, there is no difference between the density of a streak that occurs in the analog pattern A1-P and the density of a streak that occurs in the analog pattern A2-P.

Streak Caused by an Exposure Defect

Figure 10A:
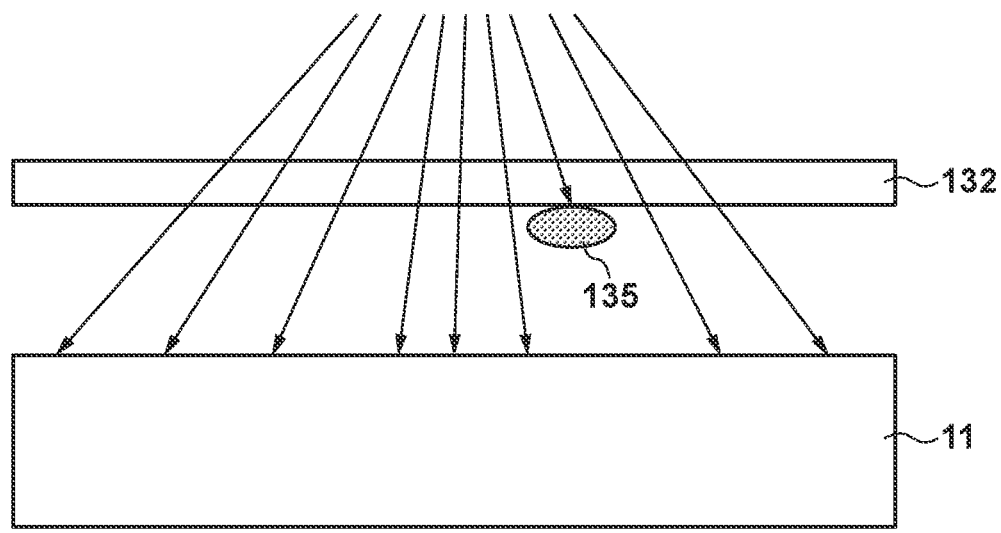
FIGS. 10A and 10B are views for describing an exposure defect and a plasticity deformation.

Next, a white streak due to an exposure defect indicated by FIG. 7 is described. FIG. 10A is a view for describing a mechanism where a white streak due to an exposure defect occurs. A dustproof glass 132 is provided in a light path along which a laser beam outputted from the exposure unit 13 passes. When a foreign particle 135 such as a hair or toner adheres to a portion of the dustproof glass 132, a laser beam irradiated onto the front surface of the photosensitive drum 11 is blocked. That is, a vertical streak occurs when the potential of the electrostatic latent image of a part at which the laser beam is not irradiated due to the foreign particle 135 on the front surface of the photosensitive drum 11 decreasing. This vertical streak becomes a white streak because it occurs due to the amount of adhered toner decreasing. The response method for reducing a white streak caused by an exposure defect is to perform cleaning work on the dustproof glass 132, or to replace the exposure unit 13.

Characteristics of a white streak due to an exposure defect are described using FIG. 7. Firstly, a streak does not occur in a plain region W-P where an image pattern is not formed. The color where a streak occurs in the digital pattern D-P is the color the exposure unit 13 that caused an exposure defect is responsible for.

Figure 11A:
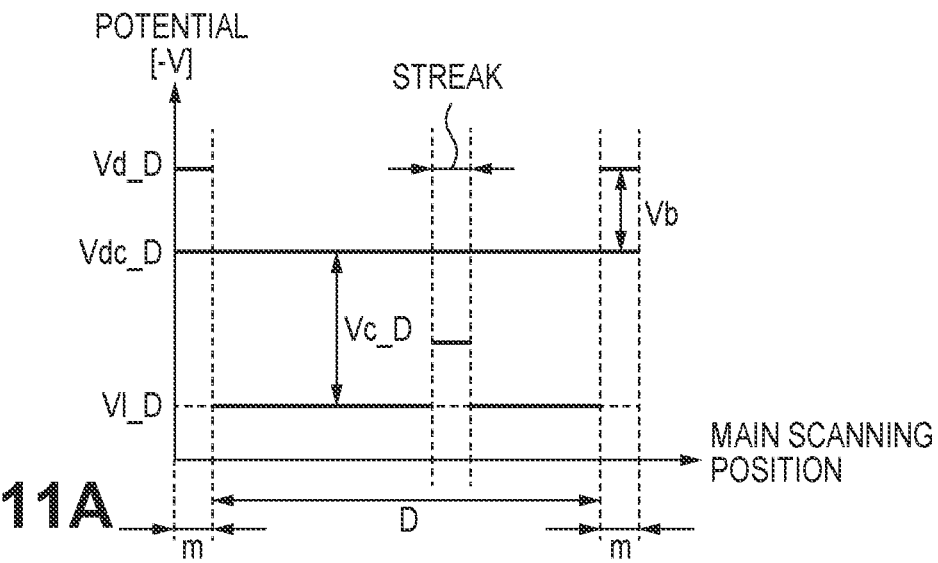
FIGS. 11A to 11F are views for describing a relationship among streaks, latent image potential, charging potential, and developing potential.
Figure 11B:
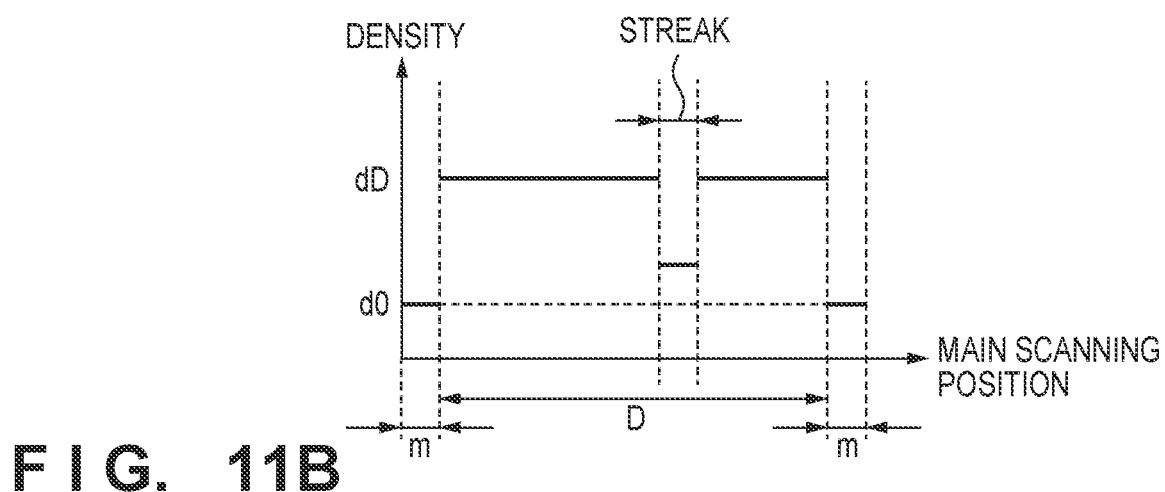
Figure 11C:
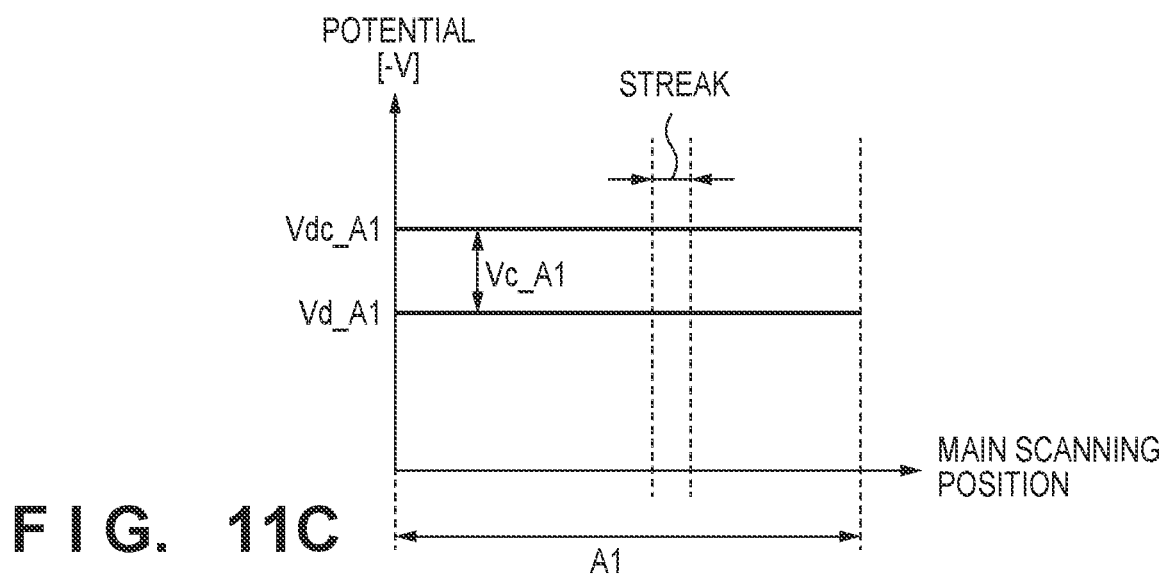
Figure 11D:
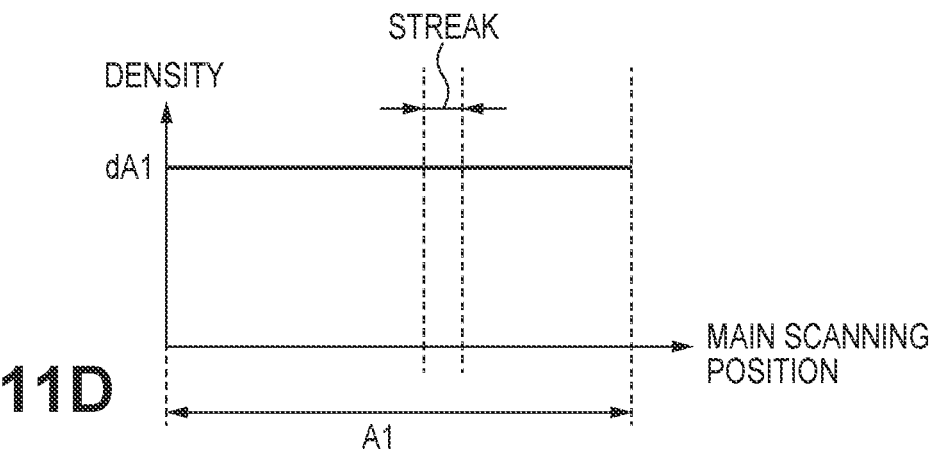
Figure 11E:
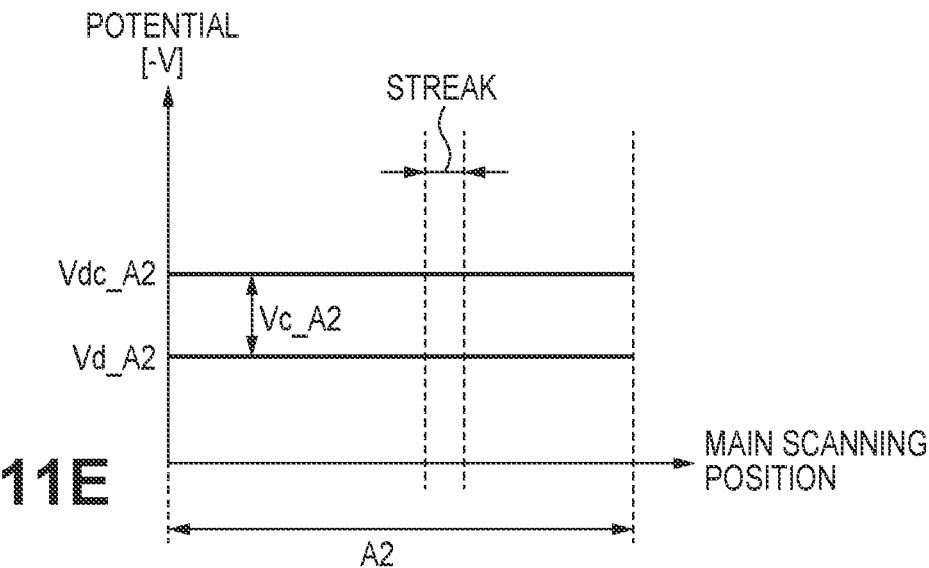
Figure 11F:
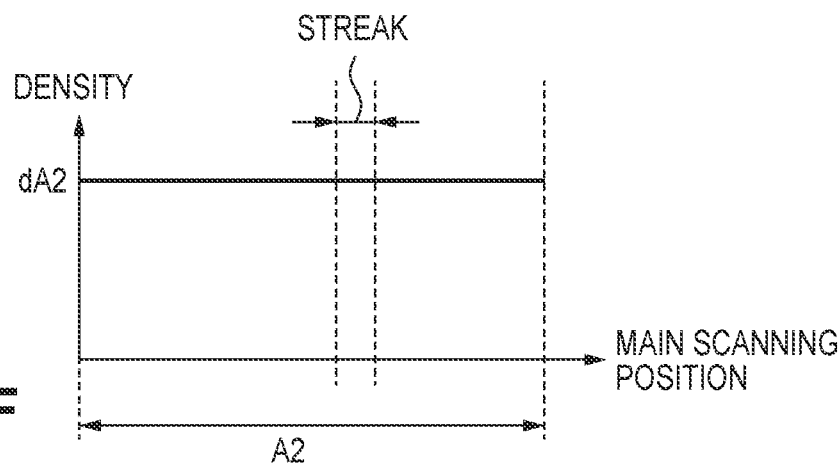

FIG. 11A illustrates potentials at each main scanning position of the photosensitive drum 11 when a digital pattern D-P is formed. FIG. 11B illustrates optical density at each main scanning position of a sheet S when the digital pattern D-P is formed. FIG. 11C illustrates potentials at each main scanning position of the photosensitive drum 11 when an analog pattern A1-P is formed. FIG. 11D illustrates optical density at each main scanning position of a sheet S when an analog pattern A1-P is formed. FIG. 11E illustrates potentials at each main scanning position of the photosensitive drum 11 when an analog pattern A2-P is formed. FIG. 11F illustrates optical density at each main scanning position of a sheet S when an analog pattern A2-P is formed.

As illustrated by FIG. 11A or FIG. 11B, a white streak occurs due to an exposure defect (an amount of exposure light getting smaller). Accordingly, in the digital pattern D-P, a white streak occurs by a surface potential at a portion of main scanning positions of the photosensitive drum 11 getting higher than Vl_D. In contrast, as illustrated by FIG. 11C through FIG. 11F, a streak does not occur for the analog patterns A1-P and A2-P because the analog patterns A1-P and A2-P are formed without applying exposure.

Streak Caused by a Charge Defect

Figure 12A:
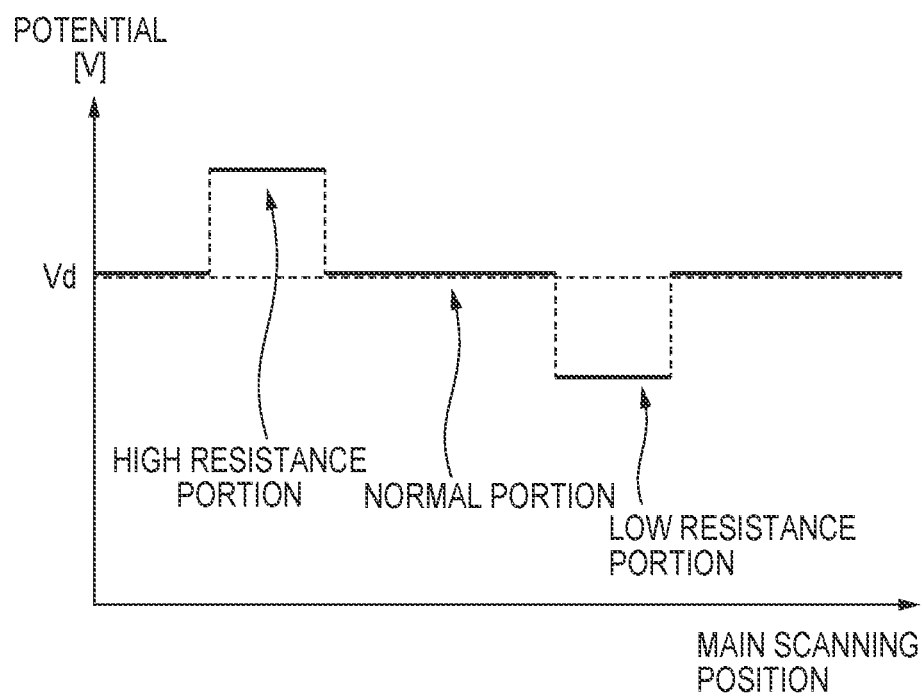
FIGS. 12A and 12B are views for describing a relationship between a streak and a cleaning defect of a photosensitive drum.
Figure 12B:
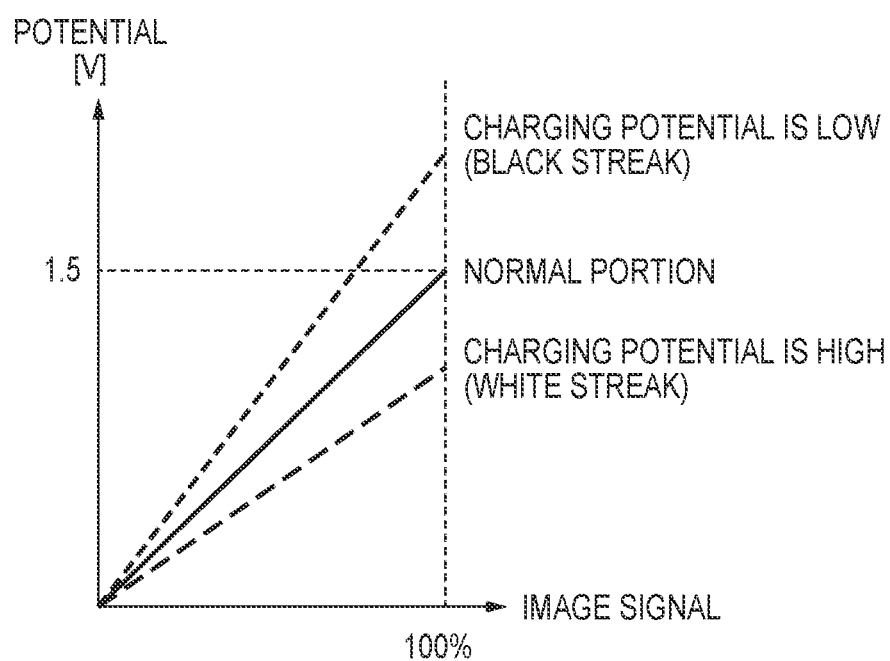

A contact charging scheme in which the photosensitive drum 11 is caused to contact a charging member to perform charging is employed for the charger unit 12 of the present embodiment. In the contact charging scheme, an additive agent such as silicone may adhere to the charging member due to insufficient cleaning at a position in the main scanning direction on the front surface of the photosensitive drum 11. FIG. 12A is a view that illustrates the surface potential (the charging potential) of the photosensitive drum 11. FIG. 12B is a view for illustrating a relationship between an image signal and optical density. As illustrated by FIG. 12A, the resistance of a charging member increases at main scanning positions for a portion of surface of the photosensitive drum 11, and the charging potential for these positions increases. A main scanning region at which the resistance increased is called a high resistance portion. When the charging potential increases, as illustrated by FIG. 12B, even if each main scanning position of the photosensitive drum 11 is exposed using the same image signal, the density of the high resistance portion becomes less than the predetermined density (0.6), and a white streak occurs.

Meanwhile, toner adheres to the charging member when a cleaning defect occurs in the main scanning position in a portion of the front surface of the photosensitive drum 11. The resistance of a part at which toner adheres in the front surface of the charging member becomes lower. The resistance of the charging member gradually increases due to endurance, but the resistance of the charging member becomes partially lower even if a surface layer of the charging member is stripped off. As a result, as illustrated by FIG. 12A, the resistance of a charging member at a portion of the main scanning region partially decreases, and the charging potential decreases. This part is called a low resistance portion. When the charging potential decreases, as illustrated by FIG. 12B, even if each main scanning position of the photosensitive drum 11 is exposed using the same image signal, the density of the low resistance portion becomes higher than the predetermined density (0.6), and a black streak occurs.

Characteristics of a charge defect streak are described using FIG. 7. Firstly, a streak does not occur in a plain region W-P where an image pattern is not formed. The color out of YMCBk where a streak occurs is the color the charger unit 12 that caused a charge defect is responsible for.

Figure 13A:
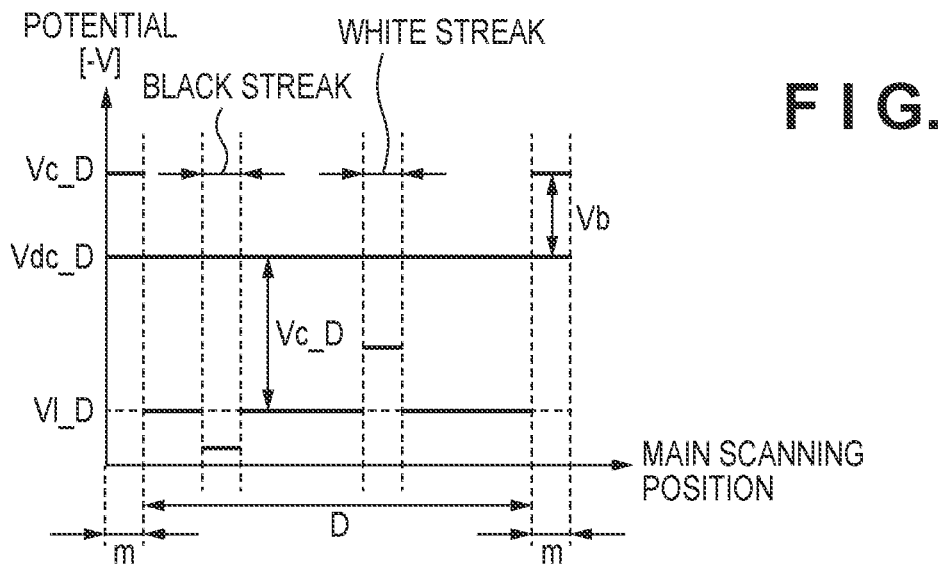
FIGS. 13A to 13F are views for describing a relationship among streaks, latent image potential, charging potential, and developing potential.
Figure 13B:
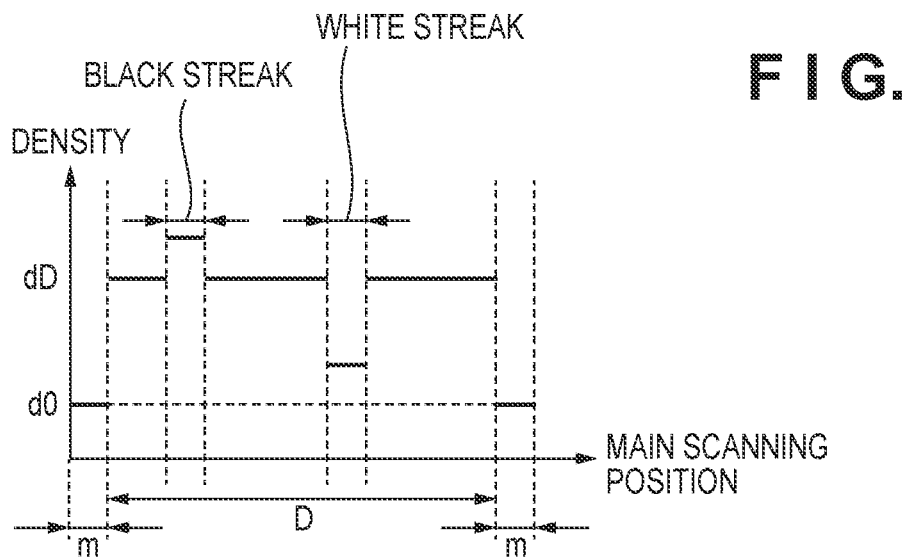
Figure 13C:
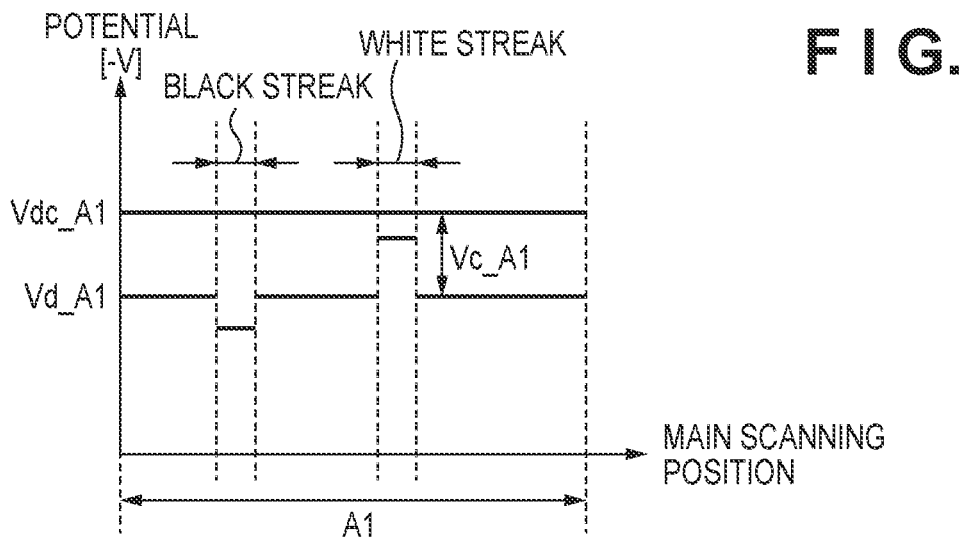
Figure 13D:
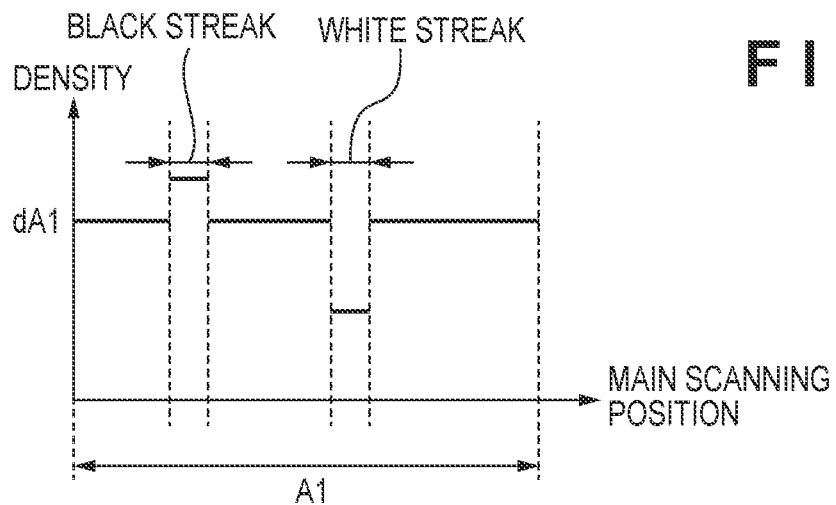
Figure 13E:
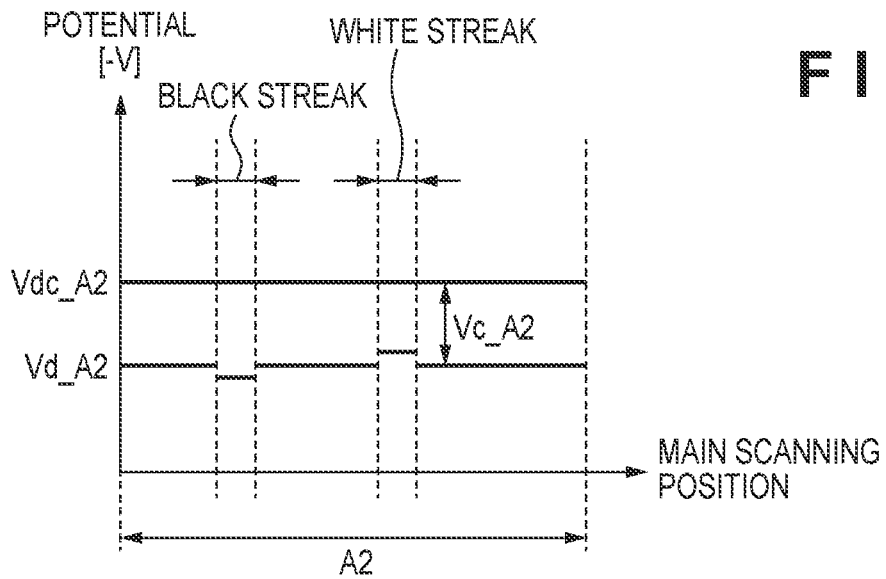
Figure 13F:
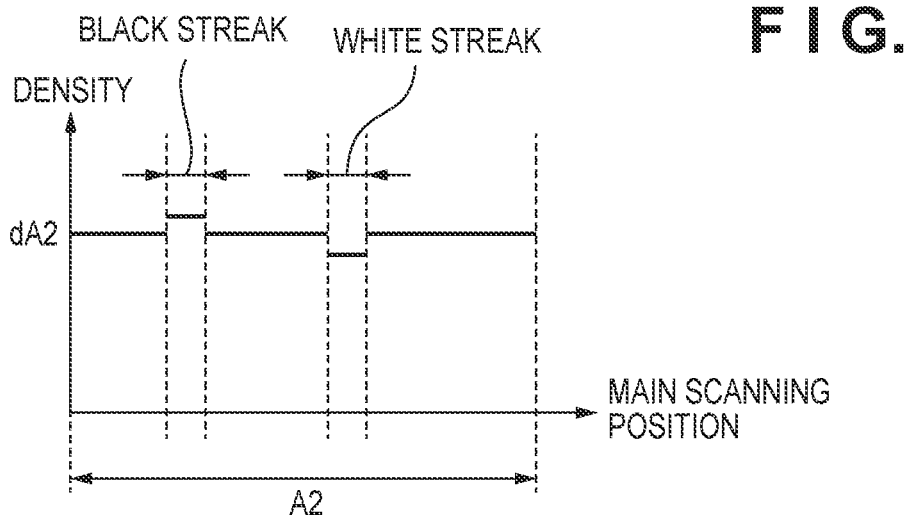

FIG. 13A illustrates potentials at each main scanning position of the photosensitive drum 11 when a digital pattern D-P is formed. FIG. 13B illustrates optical density at each main scanning position of a sheet S when the digital pattern D-P is formed. FIG. 13C illustrates potentials at each main scanning position of the photosensitive drum 11 when an analog pattern A1-P is formed. FIG. 13D illustrates optical density at each main scanning position of a sheet S when an analog pattern A1-P is formed. FIG. 13E illustrates potentials at each main scanning position of the photosensitive drum 11 when an analog pattern A2-P is formed. FIG. 13F illustrates optical density at each main scanning position of a sheet S when an analog pattern A2-P is formed.

As illustrated by FIG. 13A and FIG. 13B, the charging potential at the main scanning positions of a portion of the photosensitive drum 11, which is exposed by the digital pattern D-P, differs from Vl_D. A black streak occurs at a position where the charging potential is lower than Vl_D, and a white streak occurs at a position where the charging potential is higher than Vl_D. As illustrated by FIG. 13C and FIG. 13D, a black streak or a white streak occur even with the analog pattern A1-P because the charging potential at a portion in the main scanning direction differs from Vd_A1. Because the charge defect occurs due to a charging member resistance difference, the charge defect is reduced by causing the charging potential of the charger unit 12 to decrease. As illustrated by FIG. 13E and FIG. 13F, the impact of a charge defect is smaller with the analog pattern A2-P, in comparison to the analog pattern A1-P. That is, the streak improves. A streak improving means that the difference between the optical density of the streak and the surrounding optical density (0.6) decreases. That is, when a streak improves, it becomes more difficult to notice the streak visually.

Streak Caused by a Plasticity Deformation of the Intermediate Transfer Belt

Figure 10B:
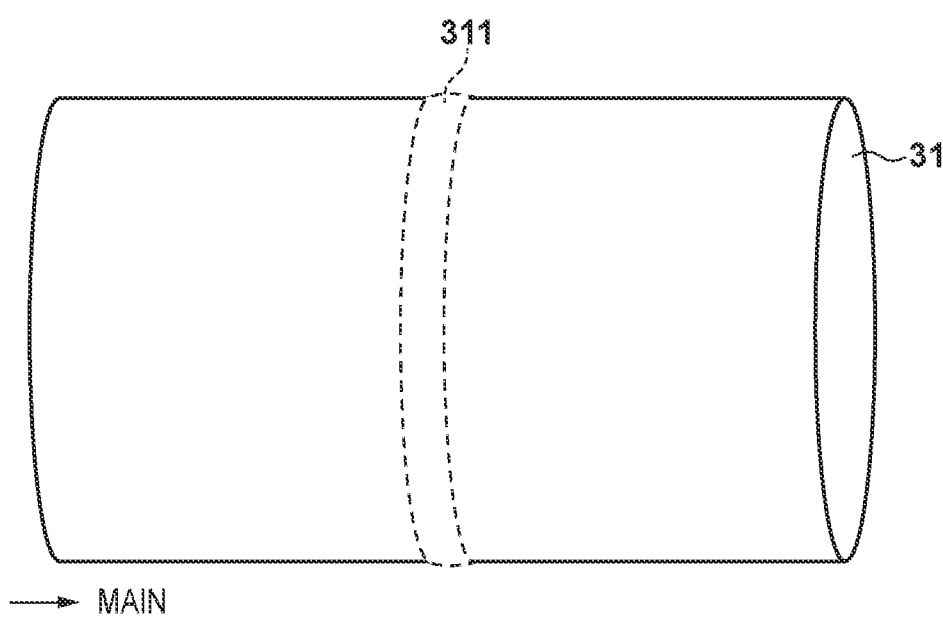

Next, a streak due to a plasticity deformation of the intermediate transfer belt 31 indicated by FIG. 7 is described. An inner surface of the intermediate transfer belt 31 that is used for a long period may be scraped, producing a powder. For example, a portion of a part that configures the transfer cartridge may adhere to the surface of the rollers 36 and 37. As illustrated by FIG. 10B, a portion of the intermediate transfer belt 31 is subject to a plasticity deformation to become a convex shape. Such a portion is called a convex portion 311. When the convex portion 311 occurs on the intermediate transfer belt 31 in this way, it becomes difficult for both sides of the convex portion 311 to be in contact with the photosensitive drum 11 or a sheet S. Accordingly, it becomes difficult to secondary transfer a toner image to the sheet S at both side portions, and white streaks occur. A black streak occurs for the convex portion 311 because a lot of toner transfers to the sheet S. Accordingly, the part to be replaced in order to resolve a streak due to a plasticity deformation of the intermediate transfer belt 31 is the transfer cartridge. Note that a white streak is not a streak of a white color, but rather is a pale streak where the density is low (there is less toner). Also, a black streak is a dense streak where the density is high (there is more toner).

Characteristics of a streak due to a plasticity deformation are described using FIG. 7. Firstly, a streak does not occur in a plain region W-P where an image pattern is not formed. Colors out of YMCBk where a streak occurs are all colors. This is because a streak of this type occurs in a secondary transfer unit. In addition, because there is no relationship between the existence or absence of exposure and a charging potential, streaks occur even with the analog patterns A1-P and A2-P in addition to the digital pattern D-P.

Streak Caused by a Photosensitive Drum Cleaning Defect

A streak caused by a cleaning defect of the photosensitive drum 11 is a black streak. A portion of the cleaning blade of the drum cleaner 15 is defective. This defective part cannot scrape off toner remaining on the photosensitive drum 11 after the primary transfer. This becomes the cause of a black streak. This black streak occurs for a color that the drum cleaner 15, in which the cleaning defect occurred, is responsible for. Note that a black streak caused by a cleaning defect occurs as an approximately straight line shaped streak in the plain region W-P. Accordingly, the part to be replaced in order to reduce streaks due to a cleaning defect of the photosensitive drum 11 is the process cartridge 50.

Characteristics of a streak due to a cleaning defect are described using FIG. 7. Because streaks due to a cleaning defect occur, streaks also occur in the plain region W-P in which an image pattern is not formed. The color of a streak that occurs in the plain region W-P is the same color as the color of toner accumulated on the drum cleaner 15. Thus the type of the streak is a monochrome streak. Because the streak occurs even for a color for which an image is not formed, it occurs in patterns of all of the colors of yellow, magenta, cyan, and black. For example, when the drum cleaner 15 responsible for yellow is defective, a yellow streak occurs across all regions in the sub scanning direction of the sheet S, and thus a streak occurs in patterns of all colors. In addition, because there is no relationship between the existence or absence of exposure and a charging potential, streaks occur with any of the analog patterns A1-P and A2-P and the digital patterns D-P.

Streak Caused by an Intermediate Transfer Belt Cleaning Defect

A black streak that occurs due to a cleaning defect of the intermediate transfer belt 31 is described using FIG. 7. When a portion of a member (a blade or the like) that makes contact with the intermediate transfer belt 31 in the transfer cleaner 35 is defective, a black streak occurs. This occurs because toner remaining on the intermediate transfer belt 31 after the secondary transfer cannot be scraped off. The color of a streak of this type is a color in which yellow, magenta, cyan, and black toner are mixed (a mixed color). Thus, the unit that should be replaced to reduce a black streak that occurs due to a defect in cleaning the intermediate transfer belt 31 is the transfer cleaner 35.

Characteristics of a streak that occurs due to a cleaning defect of the intermediate transfer belt 31 are described using FIG. 7. Because a cleaning defect is the cause, streaks also occur in the plain region W-P in which an image pattern is not formed. A streak that occurs in the plain region W-P is in accordance with toner that has accumulated on the transfer cleaner 35, and thus the color of the streak is a mixture of colors of yellow, magenta, cyan, and black. In addition, because there is no relationship between the existence or absence of exposure and a charging potential, streaks occur with any of the analog patterns A1-P and A2-P and the digital patterns D-P.

[Replacement Part Identification Processing]

Processing for generating a chart and replacement part identification processing for identifying a replacement part are described using FIG. 14. Upon being input with an instruction for identifying a replacement part or an instruction for generating the charts 301, 302, and 303 from the input apparatus 62, the CPU 60 executes the following processing.

In step S101, the CPU 60 (the chart generation unit 64) controls the printer 3 to generate the charts 301 through 303. The CPU 60 controls the printer 3 to cause the digital patterns D-P, the analog patterns A1-P, the analog patterns A2-P, and the camouflage patterns W-Ca, D-Ca, A1-Ca, and A2-Ca to be formed on sheets S.

In the case of forming a plain region W-P, the charge control unit 65 controls the charging power supply 68 so that the surface potential of the photosensitive drum 11 becomes the charging potential Vd_D. In a case of forming the plain region W-P, the developing control unit 66 controls the developing power supply 69 so that the potential of the developing sleeve of the developing unit 14 becomes a developing potential Vdc_D. To form the camouflage pattern W-Ca on the plain region W-P, the exposure unit 13 exposes the photosensitive drum 11 based on the camouflage pattern W-Ca. The exposure unit 13 does not expose a position where the camouflage pattern is not to be formed in the plain region W-P. By this, the plain region W-P to which the camouflage pattern W-Ca has been added is formed on a sheet S (the chart 301). Here, the camouflage pattern W-Ca is formed using black toner, for example.

Next, in a case of forming the yellow digital pattern D-P-Y, the charge control unit 65 controls the charging power supply 68 so that the surface potential of the photosensitive drum 11y becomes the charging potential Vd_D. The exposure unit 13y exposes the photosensitive drum 11y based on pattern image data for forming the digital pattern D-P-Y. In a case of forming the digital pattern D-P-Y, the developing control unit 66 controls the developing power supply 69 so that the potential of the developing sleeve of the developing unit 14y becomes the developing potential Vdc_D. In order to superimpose the blue camouflage pattern D-Ca-Y on the digital pattern D-P-Y, the charge control unit 65 controls the charging power supply 68 so that the surface potentials of the photosensitive drums 11m and 11c become the charging potential Vd_D. The exposure units 13m and 13c expose the photosensitive drums 11m and 11c based on pattern image data for forming the camouflage pattern D-Ca-Y. In order to form the camouflage pattern D-Ca-Y, the developing control unit 66 controls the developing power supply 69 so that the potential of the developing sleeves of the developing units 14m and 14c become the developing potential Vdc_D. By this, the blue camouflage pattern D-Ca-Y, which is of a complementary color to yellow, is superimposed on the digital pattern D-P-Y. Note that configuration may be taken such that the charging potential Vd_D for forming the yellow digital pattern D-P-Y and the charging potential Vd_D for forming the camouflage pattern D-Ca-Y are not the same value. Similarly, configuration may be taken such that the developing potential Vdc_D for forming the yellow digital pattern D-P-Y and the charging potential Vdc_D for forming the camouflage pattern D-Ca-Y are not the same value.

The magenta digital pattern D-P-M, the cyan digital pattern D-P-C, and the black digital pattern D-P-Bk are similarly formed. Here, a green camouflage pattern D-Ca-M is superimposed on the magenta digital pattern D-P-M, and a red camouflage pattern D-Ca-C is superimposed on the cyan digital pattern D-P-C. The camouflage pattern D-Ca-M is formed using cyan toner and yellow toner. The camouflage pattern D-Ca-C is formed using magenta toner and yellow toner. However, because there is no complementary color for black, the green camouflage pattern D-Ca-Bk is superimposed on the black digital pattern D-P-Bk. This is because green is a color that has ΔE00≥3.0 or more with respect to black. The camouflage pattern D-Ca-Bk is formed using cyan toner and yellow toner.

Next, in a case of forming a yellow analog pattern A1-P-Y, the charge control unit 65 controls the charging power supply 68 so that the surface potential of the photosensitive drum 11y becomes the charging potential Vd_A1. In a case of forming the yellow analog pattern A1-P-Y, the developing control unit 66 controls the developing power supply 69 so that the potential of the developing sleeve of the yellow developing unit 14y becomes the developing potential Vdc_A1. In order to superimpose the blue camouflage pattern A1-Ca-Y on the yellow analog pattern A1-P-Y, the charge control unit 65 controls the charging power supply 68 so that the surface potentials of the photosensitive drums 11m and 11c become the charging potential Vd_A1. The exposure units 13m and 13c expose the photosensitive drums 11m and 11c, based on the pattern image data for forming the camouflage pattern A1-Ca-Y. In order to form the camouflage pattern A1-Ca-Y, the developing control unit 66 controls the developing power supply 69 so that the potential of the developing sleeves of the developing units 14m and 14c become the developing potential Vdc_A1. By this, the blue camouflage pattern A1-Ca-Y, which is of a complementary color to yellow, is superimposed on the analog pattern A1-P-Y. Note that configuration may be taken such that the charging potential Vd_A1 for forming the yellow analog pattern A1-P-Y and the charging potential Vd_A1 for forming the camouflage pattern A1-Ca-Y are not the same value. Similarly, configuration may be taken such that the developing potential Vdc_A1 for forming the yellow analog pattern A1-P-Y and the charging potential Vdc_A1 for forming the camouflage pattern A1-Ca-Y are not the same value.

The magenta analog pattern A1-P-M, the cyan analog pattern A1-P-C, and the black analog pattern A1-P-Bk are similarly formed. Here, a green camouflage pattern A1-Ca-M is superimposed on the magenta analog pattern A1-P-M, and a red camouflage pattern A1-Ca-C is superimposed on the cyan analog pattern A1-P-C. The camouflage pattern A1-Ca-M is formed using cyan toner and yellow toner. The camouflage pattern A1-Ca-C is formed using magenta toner and yellow toner. However, because there is no complementary color for black, the green camouflage pattern A1-Ca-Bk is superimposed on the black analog pattern A1-P-Bk. This is because green is a color that has ΔE00≥3.0 or more with respect to black. The camouflage pattern A1-Ca-Bk is formed using cyan toner and yellow toner.

Next, in a case of forming a yellow analog pattern A2-P-Y, the charge control unit 65 controls the charging power supply 68 so that the surface potential of the photosensitive drum 11y becomes the charging potential Vd_A2. In a case of forming the yellow analog pattern A2-P-Y, the developing control unit 66 controls the developing power supply 69 so that the potential of the developing sleeve of the yellow developing unit 14y becomes the developing potential Vdc_A2. In order to superimpose the blue camouflage pattern A2-Ca-Y on the yellow analog pattern A2-P-Y, the charge control unit 65 controls the charging power supply 68 so that the surface potentials of the photosensitive drums 11m and 11c become the charging potential Vd_A2. The exposure units 13m and 13c expose the photosensitive drums 11m and 11c, based on the pattern image data for forming the camouflage pattern A2-Ca-Y. In order to form the camouflage pattern A2-Ca-Y, the developing control unit 66 controls the developing power supply 69 so that the potential of the developing sleeves of the developing units 14m and 14c become the developing potential Vdc_A2. By this, the blue camouflage pattern A2-Ca-Y, which is of a complementary color to yellow, is superimposed on the analog pattern A2-P-Y. Note that configuration may be taken such that the charging potential Vd_A2 for forming the yellow analog pattern A2-P-Y and the charging potential Vd_A2 for forming the camouflage pattern A2-Ca-Y are not the same value. Similarly, configuration may be taken such that the developing potential Vdc_A2 for forming the yellow analog pattern A2-P-Y and the charging potential Vdc_A2 for forming the camouflage pattern A2-Ca-Y are not the same value.

The magenta analog pattern A2-P-M, the cyan analog pattern A2-P-C, and the black analog pattern A2-P-Bk are similarly formed. Here, a green camouflage pattern A2-Ca-M is superimposed on the magenta analog pattern A2-P-M, and a red camouflage pattern A2-Ca-C is superimposed on the cyan analog pattern A2-P-C. The camouflage pattern A2-Ca-M is formed using cyan toner and yellow toner. The camouflage pattern A2-Ca-C is formed using magenta toner and yellow toner. However, because there is no complementary color for black, the green camouflage pattern A2-Ca-Bk is superimposed on the black analog pattern A2-P-Bk. This is because green is a color that has ΔE00≥3.0 or more with respect to black. The camouflage pattern A2-Ca-Bk is formed using cyan toner and yellow toner.

In step S102, the CPU 60 (the diagnostic unit 67) controls the image reader 2 to read the charts 301, 302, and 303. A user or a service person places the chart 301 on the platen glass 22, and presses the read start button of the input apparatus 62. As a result, the image reader 2 outputs the read data of the chart 301 to the diagnostic unit 67. The diagnostic unit 67 obtains the read data of the chart 301 outputted from the image reader 2. Similarly a user or a service person places the chart 302 and the chart 303 on the platen glass 22 and presses the read start button. The diagnostic unit 67 obtains the read data of the charts 302 and 303 outputted from the image reader 2. The read data for the charts 301, 302, and 303 is stored in the storage apparatus 63.

In step S103, the CPU 60 (the diagnostic unit 67) obtains luminance values from the read data. The position of the plain region W-P in the chart 301 and the positions of the digital patterns D-P-Y, D-P-M, D-P-C, and D-P-Bk are decided in advance. The diagnostic unit 67 extracts, from the read data of the chart 301 stored in the storage apparatus 63, read data for a detection range corresponding to the plain region W-P, and read data of detection ranges respective corresponding to the digital patterns D-P-Y, D-P-M, D-P-C, and D-P-Bk. In addition, the positions of the analog patterns A1-P-Y, A1-P-M, A1-P-C, and A1-P-Bk in the chart 302 are decided in advance. The diagnostic unit 67 extracts, from the read data of the chart 302 stored in the storage apparatus 63, the read data of detection ranges respectively corresponding to the analog patterns A1-P-Y, A1-P-M, A1-P-C, and A1-P-Bk. Similarly, the positions of the analog patterns A2-P-Y, A2-P-M, A2-P-C, and A2-P-Bk in the chart 303 are decided in advance. The diagnostic unit 67 extracts, from the read data of the chart 303 stored in the storage apparatus 63, the read data of detection ranges respectively corresponding to the analog patterns A2-P-Y, A2-P-M, A2-P-C, and A2-P-Bk.

Next, the diagnostic unit 67 extracts read results of pixels in a complementary color relationship with the color of an image pattern. Read results for R pixels are extracted for a cyan image pattern. Read results for G pixels are extracted for a magenta image pattern. Read results for B pixels are extracted for a yellow image pattern. Read results for G pixels are extracted for black because it does not have a complementary color. These read results are luminance values. Note that the image sensor of the image reader 2 is a CCD sensor, a CMOS sensor, or the like, and has R pixels, G pixels, and B pixels. Because a red filter is provided for an R pixel, it cannot read a camouflage pattern formed by red. Consequently, the camouflage pattern is removed or reduced in the read result of the image pattern. By a similar principle for magenta, yellow, and black, camouflage patterns are removed or reduced in image pattern read results.

The diagnostic unit 67 obtains an average value of output values (luminance values) of pixels corresponding to a detection range. For example, assume that a detection range is configured by a pixel group having n rows×m columns. This pixel group has n pixels lined up in an X direction (the sub scanning direction), and m pixels lined up in a Y direction (the main scanning direction). Firstly, the diagnostic unit 67 obtains a sum of respective luminance values of the n pixels included in a first column, and divides this sum by n. As a result, an average luminance value of the first column in the detection range is obtained. The diagnostic unit 67 obtains an average luminance value for each of the second column to the m-th column, similarly to for the first column.

In step S104, the CPU 60 (the diagnostic unit 67) uses a density conversion table stored in the storage apparatus 63 to convert the m luminance values (averages) to densities. The density conversion table is stored in a ROM of the storage apparatus 63 at a time of shipment from a factory of the image forming apparatus 1.

In step S105, the CPU 60 (the diagnostic unit 67) decides a density change rate for each column. The density change rate is decided based on the following equation, for example.

Density change rate=(density of target column−density of other column different from target column)/density of target column    (1)

Here, the density of the other column different from the target column is, for example, the density of a column adjacent to the target column. For example, a column adjacent to an i-th column is an (i−1)-th column (i>1).

In step S106, the CPU 60 (the diagnostic unit 67) detects a streak from a result of reading the charts 301 through 303. For example, the diagnostic unit 67 determines that there is a streak in a target column if the density change rate of the target column is greater than a threshold value. The threshold value is 7%, for example.

A vertical streak may occur across a plurality of columns lined up in the Y direction (the main scanning direction). In a case where there is a vertical streak in both an i-th target column and an i+1-th target column, it is not possible to determine a vertical streak when Equation (1) is applied unchanged. Accordingly, a design as below is necessary. Assume that the diagnostic unit 67 does not detect a vertical streak in the i−1-th column, but detects a vertical streak in the subsequent i-th target column. In such a case, the diagnostic unit 67 obtains the density change rate of the i+1-th target column after keeping the i−1-th column as the other column for the i+1-th target column in Equation (1). By this, it is possible to detect a vertical streak that occurs in the i+1-th column. Note that step S105 and step S106 are repeatedly executed for each column from the first column until the m-th column.

The diagnostic unit 67 distinguishes a streak whose density is greater than the predetermined density (0.6) as a black streak, and distinguishes a streak whose density is lower than the predetermined density (0.6) as a white streak. The diagnostic unit 67 stores, in the storage apparatus 63, the position at which the streak was detected in the Y direction (the main scanning direction), the color of the streak, and a luminance difference between a luminance corresponding to the predetermined density and the luminance of the streak as feature amounts of the streak. Note that the position where the streak was detected indicates where the streak occurred among the plain region W-P, the digital patterns D-P, and the analog patterns A1-P and A2-P. A luminance difference for a streak that occurs in the analog patterns A1-P, and a luminance difference for a streak that occurs in the analog patterns A2-P are useful for determining whether the streak improved. A charging potential for forming the analog patterns A1-P is higher than a charging potential for forming the analog patterns A2-P. Accordingly, if a luminance difference for a streak that occurs in the analog patterns A2-P is less than a luminance difference for a streak that occurs in the analog patterns A1-P, it is determined that the streak is due to a charge defect of the charger unit 12. In contrast, if a luminance difference for a streak that occurs in the analog patterns A2-P is greater than a luminance difference for a streak that occurs in the analog patterns A1-P, it is determined that the streak is due to a developing defect of the developing unit 14.

Processing as below is executed for a detection region of the plain region W-P. The CPU 60 calculates an average value of the luminance values of each row for each of R pixels, G pixel, and B pixels. The average luminance value of the R pixels is converted to a density Dr. The average luminance value of the G pixels is converted to a density Dg. The average luminance value of the B pixels is converted to a density Db. The CPU 60 determines that a streak has occurred if at least one the densities Dr, Dg, and Db is greater than a predetermined density. Furthermore, the CPU 60 determines whether the color of the streak is a monochrome or a mixed color, based on a combination of the densities Dr, Dg, and Db.

In step S107, the CPU 60 (the diagnostic unit 67) identifies the cause of the streak and a replacement part (or a response method) based on a result of reading the charts 301 through 303 (a streak detection result). In other words, the diagnostic unit 67 determines a causal part of the streak based on the read data. For example, the diagnostic unit 67 distinguishes the existence or absence of a streak and the color (monochrome (YMCBk)/mixed color, or the like) of the streak for each YMCBk image pattern or plain region W—P based on streak feature amounts stored in the storage apparatus 63. The diagnostic unit 67 identifies the cause and the replacement part by comparing the result of distinguishing with an identification condition for identifying the cause and replacement part.

In step S108, the CPU 60 (the diagnostic unit 67) displays on the display apparatus 61 a message indicating the replacement part or the response method or transmits this message to the PC 124 or the server 128 via the communication IF 55.

FIG. 15 illustrates an example of a message indicating a replacement part or a response method. The message includes information such as that a vertical streak (a streak that extends in the sub scanning direction) has occurred in the charts 301 through 303, a code indicating a cause, and a name of a replacement part. A user or a service person can easily understand what the cause of the streak is and what the replacement part is by referring to the message. Note that if a vertical streak is not detected, the diagnostic unit 67 displays on the display apparatus 61 a message indicating that the image forming apparatus 1 is normal. In this way, a user, a service person or the like can easily comprehend what the replacement part is because they can know that a vertical streak occurred and what the replacement part is by the specific information.

[Details of Replacement Part Identification Processing]

Figure 16A:
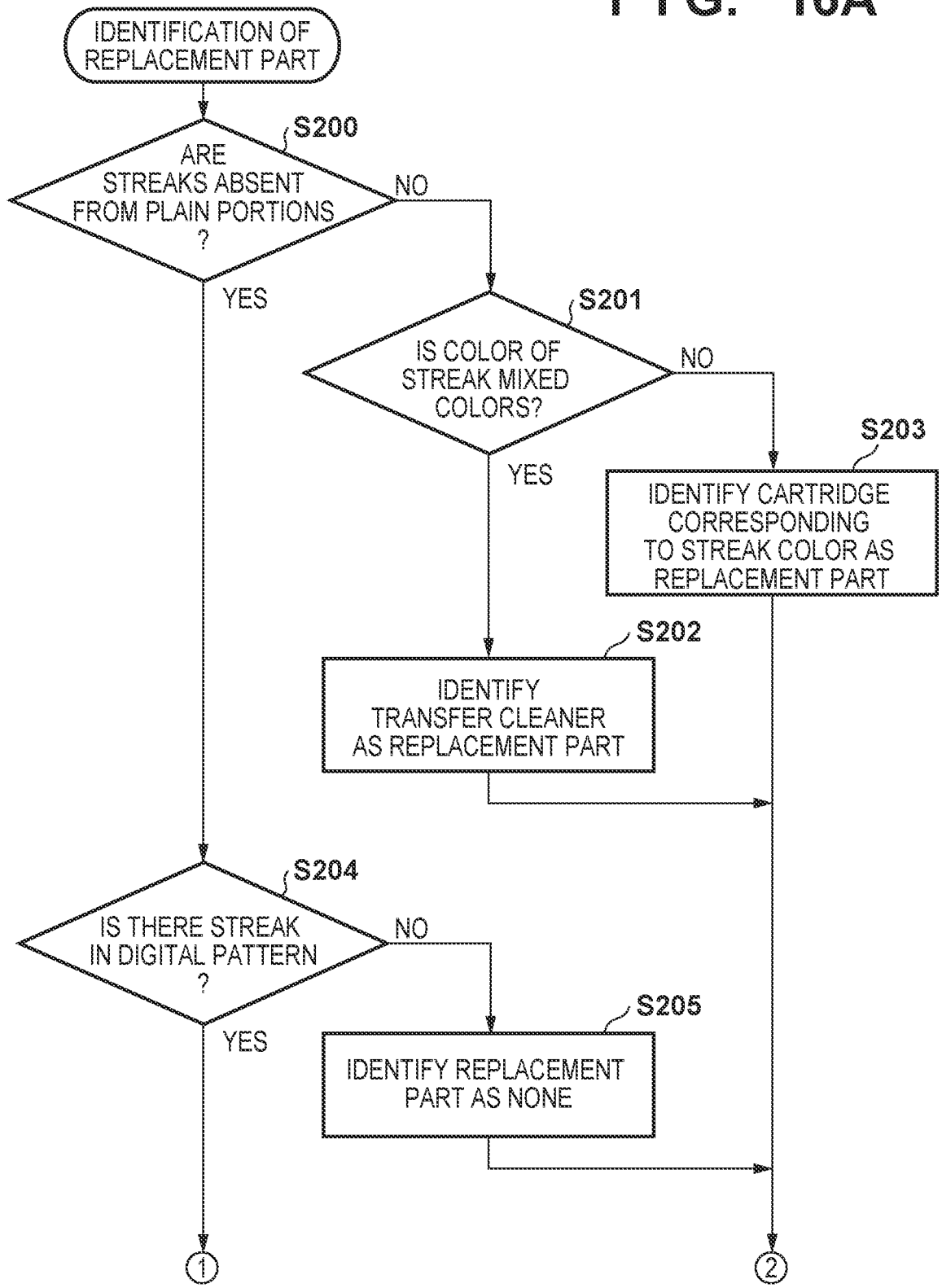
FIGS. 16A and 16B are flowcharts illustrating processing for identifying a replacement part.
Figure 16B:
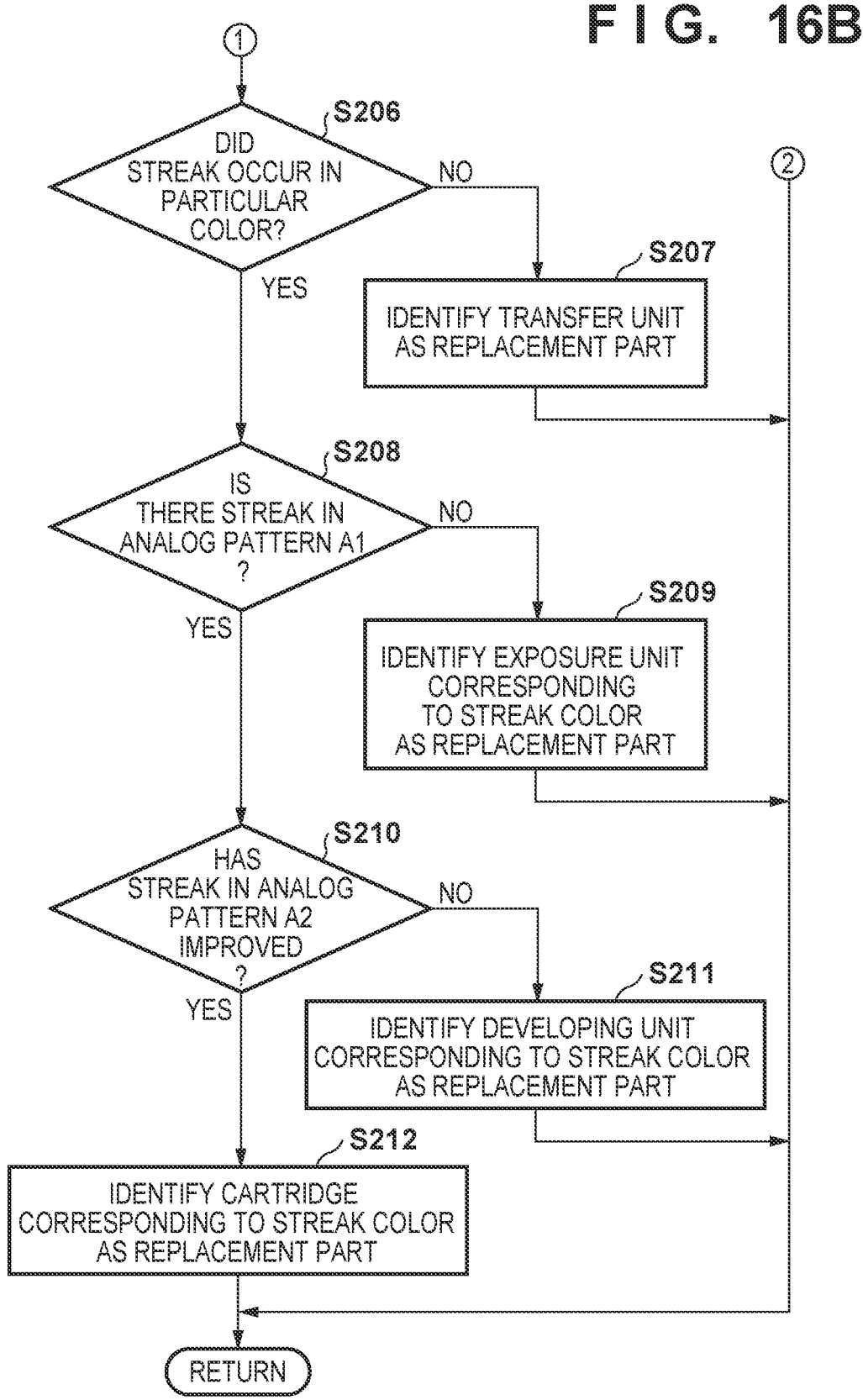

FIGS. 16A and 16B are flowcharts illustrating details of processing for identifying a replacement part and a response method. Here, there is possibility that a vertical streak is detected at a plurality of main scanning positions in one chart. In such a case, there is the possibility that the cause of a plurality of vertical streaks are respectively different. Accordingly, the CPU 60 (the diagnostic unit 67) identifies the cause and the replacement part for each streak. Note that the replacement part may be identified by identifying the cause of the occurrence of the streak. The determination processing illustrated in FIGS. 16A and 16B may be a set of identification conditions for identifying a replacement part or a cause.

In step S200, the CPU 60 reads feature amounts from the storage apparatus 63, and determines whether streaks are absent from the plain region W-P. The coordinates of the plain region W-P in the chart 301 are known beforehand. The CPU 60 compares the position of a streak and the coordinates of the plain region W-P to distinguish existence or absence of a streak in the plain region W-P. If there is a streak in the plain region W-P, the CPU 60 proceeds to step S201.

In step S201, the CPU 60 determines whether or not the color of the streak is a mixed color. If the color of the streak is a mixed color, the CPU 60 advances to step S202. In step S202, the CPU 60 distinguishes that the cause of the streak is a defect in cleaning the intermediate transfer belt 31, and identifies the transfer cleaner 35 as the replacement part. Meanwhile, if the color of the streak is a monochrome of any of YMCBk, the CPU 60 advances to step S203.

In step S203, the CPU 60 distinguishes the cause of the streak to be a cleaning defect of the photosensitive drum 11, and identifies the process cartridge 50 corresponding to the color of the streak as the replacement part. If a streak in the plain region W-P was not detected in step S200, the CPU 60 advances to step S204.

In step S204, the CPU 60 reads feature amounts from the storage apparatus 63, and determines whether a streak is present in the digital patterns D-P-Y through D-P-Bk. The coordinates of the digital patterns D-P-Y through D-P-Bk in the charts 301 through 303 are known beforehand. The CPU 60 compares the coordinates of the digital patterns D-P-Y through D-P-Bk with the position of a streak to distinguish existence or absence of a streak in the digital patterns D-P-Y through D-P-Bk. If there is no streak in any of the digital patterns D-P-Y through D-P-Bk, the CPU 60 advances to step S205.

In step S205, the CPU 60 identifies that there is no replacement part (normal). Meanwhile, upon detecting a streak in any of the digital patterns D-P-Y through D-P-Bk, the CPU 60 advances to step S206.

In step S206, the CPU 60 reads feature amounts from the storage apparatus 63, and determines whether or not a streak occurs in a particular color. This is the same as determining whether a streak occurs in all colors (all of the digital patterns D-P-Y through D-P-Bk). If a streak is occurring for all colors, the CPU 60 advances to step S207.

In step S207, the CPU 60 distinguishes that the cause of the streak is a plasticity deformation of the intermediate transfer belt 31, and identifies a transfer cartridge which includes the intermediate transfer belt 31 as the replacement part. Meanwhile, if a streak is occurring for a particular color, the CPU 60 advances to step S208.

In step S208, the CPU 60 determines whether a streak has occurred in an analog pattern A1-P of the same color as the color of a digital pattern D-P where a streak occurred. If there is no streak in the analog pattern A1-P, the CPU 60 advances to step S209.

In step S209, the CPU 60 distinguishes that the cause of the streak is an exposure defect, and identifies the exposure unit 13 corresponding to the color of the streak as the replacement part. Note that the CPU 60 may identify cleaning of the exposure unit 13 corresponding to the color of the streak as the response method. When a streak has occurred in an analog pattern A1-P of the same color as the color where a streak occurred in the digital pattern D-P, the CPU 60 advances to step S210.

In step S210, the CPU 60 determines whether a streak in an analog pattern A2-P has improved with respect to a streak in an analog pattern A1-P. Note that the analog pattern A1 and the analog pattern A2 are of the same color. For example, the CPU 60 may read feature amounts from the storage apparatus 63 and compare a luminance difference (a density difference) for a streak in the analog pattern A1-P with a luminance difference (a density difference) for a streak in the analog pattern A2. If the streak in the analog pattern A2-P has not improved in comparison to the streak in the analog pattern A1-P, the CPU 60 advances to step S211.

In step S211, the CPU 60 distinguishes that the cause of the streak is a developing coat defect, and identifies the developing unit 14 corresponding to the color of the streak as the replacement part. Meanwhile, if the density difference of the streak in the analog pattern A2-P is less than the density difference of the streak in the analog pattern A1-P, the streak has improved and the CPU 60 advances to step S212. In step S212, the CPU 60 distinguishes the cause of a streak to be a charge defect, and identifies the process cartridge 50 corresponding to the color of the streak as the replacement part.

In this way, the CPU 60 generates the charts 301 through 303 and analyzes streaks that occur in the charts 301 through 303 to identify a replacement part and a cause of the streaks. Also, the CPU 60 may output a message indicating the cause of the streak and the replacement part to the display apparatus 61 or the like. By this, it becomes possible for a user or a service person to easily recognize the cause of the streak and the replacement part. Thereby, the work time (downtime) necessary for maintenance may be significantly shortened. Also, because a part involved in the streak is identified, it may be that the replacement of a part that is not involved in the streak may be avoided. Thereby, maintenance costs may also be reduced as well as maintenance time. The message indicating the cause of the streak and the replacement part may be transmitted to the server 128 of the service person via the network. Because the service person can know what the replacement part is in advance, he can reliably bring the replacement part to perform the maintenance. Processing illustrated in FIGS. 16A and 16B for identifying, for example, a replacement part or a cause of a streak may be executed with a user or a service person visually observing the charts 301 through 303.

The charts 301 through 303 illustrated in FIG. 3 are merely an example. The order of the plain region W-P, the digital pattern D-P, and the analog patterns A1-P and A2-P in the charts 301 through 303 may be another order. In other words, it is sufficient if the plain region W-P, the digital pattern D, and the analog patterns A1-P and A2-P are included in a chart. In particular, to identify whether a causal part of a streak is the charger unit 12 or the developing unit 14, it is sufficient if the analog patterns A1-P and A2-P are included in a chart.

Effect of Camouflage Pattern

By adding a camouflage pattern to an image pattern that is useful for identification of a replacement part as described above, an image defect of interest stands out visually, and an image defect that needs no attention is visually obscured. Description is given below regarding parameters of a camouflage pattern which leads to a camouflage effect.

The inventors caused the image reader 2 to read the charts 301 through 303, and obtained a read result (RGB data). Furthermore, the inventors extracted a read luminance (L*) of a complementary color with respect to the color of an image pattern out of reading results of each image pattern. The inventors applied a two-dimensional Fourier transform to the read luminance (L*) of each image pattern. The inventors calculated a radially averaged power spectrum from the result of the two-dimensional Fourier transform.

Figure 17A:
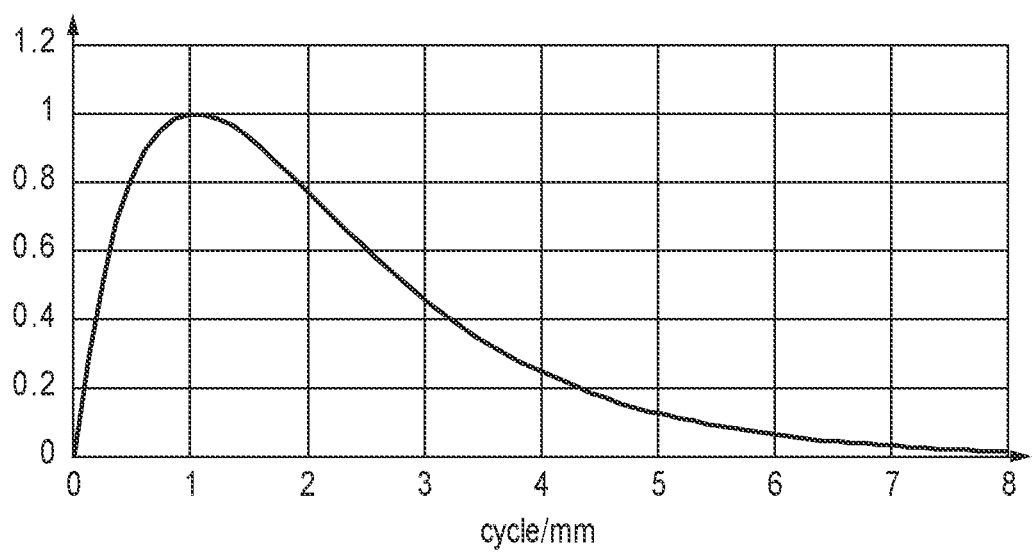
FIGS. 17A and 17B are views for describing parameters of a camouflage pattern.

FIG. 17A illustrates a Dooley VTF (visual transfer function). The abscissa indicates spatial frequency. The ordinate indicates normalized power (visual sensitivity). A viewing distance is set to 300 mm here. The inventors multiplied the VTF of FIG. 17A with the radially averaged power spectrum.

Figure 17B:
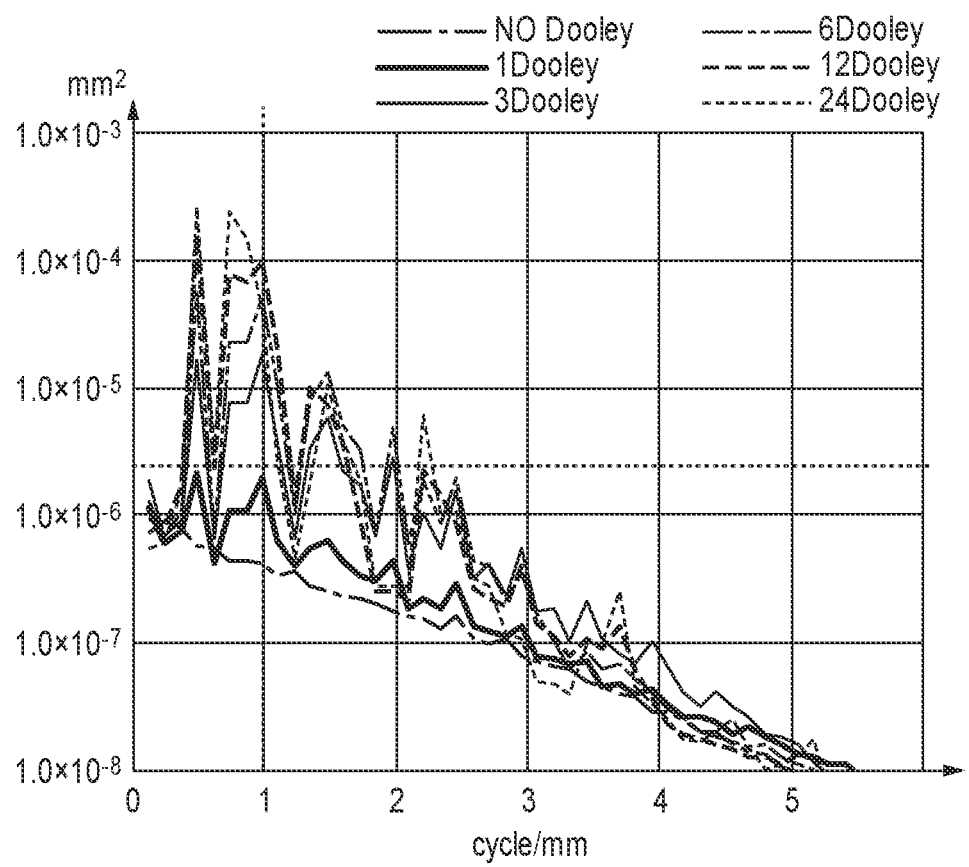

FIG. 17B illustrated a read result obtained by multiplying the VTF with various radially averaged power spectrums. "No Dooley" indicates a read result of an image pattern where a camouflage pattern is not added. Note that Ca-Length is set to 0.68 [mm]. Note that Space-Y is set to 0.68 [mm]. $\Delta Y$ is set to 0.34 [mm]. As illustrated by FIG. 18 "1Dooley" is a read result where Space-X is 1.99 [mm] and Ca-Width is 0.04 [mm]. "3Dooley" is a read result where Space-X is 1.91 [mm] and Ca-Width is 0.13 [mm]. "6Dooley" is a read result where Space-X is 1.78 [mm] and Ca-Width is 0.25 [mm]. "12Dooley" is a read result where Space-X is 1.52 [mm] and Ca-Width is 0.51 [mm]. "24Dooley" is a read result where Space-X is 1.02 [mm] and Ca-Width is 1.02 [mm].

In accordance with experimentation by the inventors, it was understood that a sufficient camouflage effect was obtained when power was larger than $1.30 \times 10^{-6}$ [mm$^2$] in a case where the spatial frequency was 1.0 [cycle/mm]. In accordance with FIG. 17B, the camouflage effect of 1Dooley is insufficient, but the camouflage effect of 3Dooley through 21Dooley is sufficient. In other words, a sufficient camouflage effect is obtained if Ca-Width is greater than or equal to 0.10 [mm]. In addition, a sufficient effect is obtained if Space-X is less than or equal to 1.93 mm. Note that a sum of Ca-Width and Space-X is fixed, and is 2.03 [mm] in this example.

As illustrated by FIG. 17B, it is sufficient if the power of the camouflage pattern is greater than $1.30 \times 10^{-6}$ [mm$^2$] in a case where the spatial frequency is 1.0 [cycle/mm]. When this condition is satisfied, an image defect not of interest is especially obscured. As illustrated by FIG. 3 or FIG. 4, a camouflage pattern includes a repeating pattern that is repeatedly arranged for each predetermined interval in each of the conveyance direction of the sheet and a direction orthogonal with the conveyance direction. The repeating pattern may be dotted lines. It is sufficient if a width of a rectangular pattern that configures the dotted lines, which is a width in the conveyance direction of the sheet, is 0.1 [mm] or more. In addition, it is sufficient if the width of a rectangular pattern that configures dotted lines is less than or equal to 5.0 [mm]. Two rectangular patterns adjacent in the conveyance direction of the sheet out of the plurality of rectangular patterns that configure dotted lines, as illustrated by FIG. 5, may be offset in a direction orthogonal to the conveyance direction of the sheet.

The repeating pattern may be a polka dot pattern as illustrated by FIG. 4. The repeating pattern may be diagonal lines. The repeating pattern may be intersecting lines. The repeating pattern may be curved lines. The repeating pattern may be a random pattern. The repeating pattern may be a texture pattern.

The image pattern may be formed using a monochrome toner. The color of a non-black image pattern and the color of a camouflage pattern added to the image pattern are in a complementary color relationship. This is because the camouflage pattern stands out with respect to the image pattern, and leads to a large camouflage effect. A green camouflage pattern is added to a black image pattern of the present embodiment. This is because there is no complementary color for black. Note that the CCD sensor 25 is an example of a sensor that has R pixels, G pixels, and B pixels, and reads a test image. The diagnostic unit 67 of the CPU 60 compares a result of reading a test image with identification conditions for identifying a replacement part to thereby identify the replacement part. The CCD sensor 25 uses a result of reading G pixels for a black test image, uses a result of reading B pixels for a yellow test image, uses a result of reading G pixels for a magenta test image, and uses a result of reading R pixels for a cyan test image. Consequently, an impact of the camouflage pattern on a result of reading a test image is reduced.

Second Embodiment

Because exposure is applied for a digital pattern D-P, the color of a camouflage pattern added to the digital pattern D-P may be any monochrome (primary color) of YMCBk, and may be a mixed color formed by using toner of different colors. However, because the analog patterns A1-P and A2-P are formed without being exposed, the colors of camouflage patterns that can be added to the analog patterns A1-P and A2-P are restricted. In principle, a camouflage pattern of a magenta monochrome, a cyan monochrome, or a black monochrome, or a camouflage pattern of mixed color formed from any two or more colors out of M, C, and Bk can be formed on yellow analog patterns A1-P-Y and A2-P-Y. With such a configuration, a yellow camouflage pattern could not conventionally be formed on yellow analog patterns A1-P-Y and A2-P-Y. Accordingly, for the image forming apparatus 1 of the second embodiment, the color of the analog patterns A1-P and A2-P and the color of the camouflage patterns A1-Ca and A2-Ca are the same color.

Figure 19A:
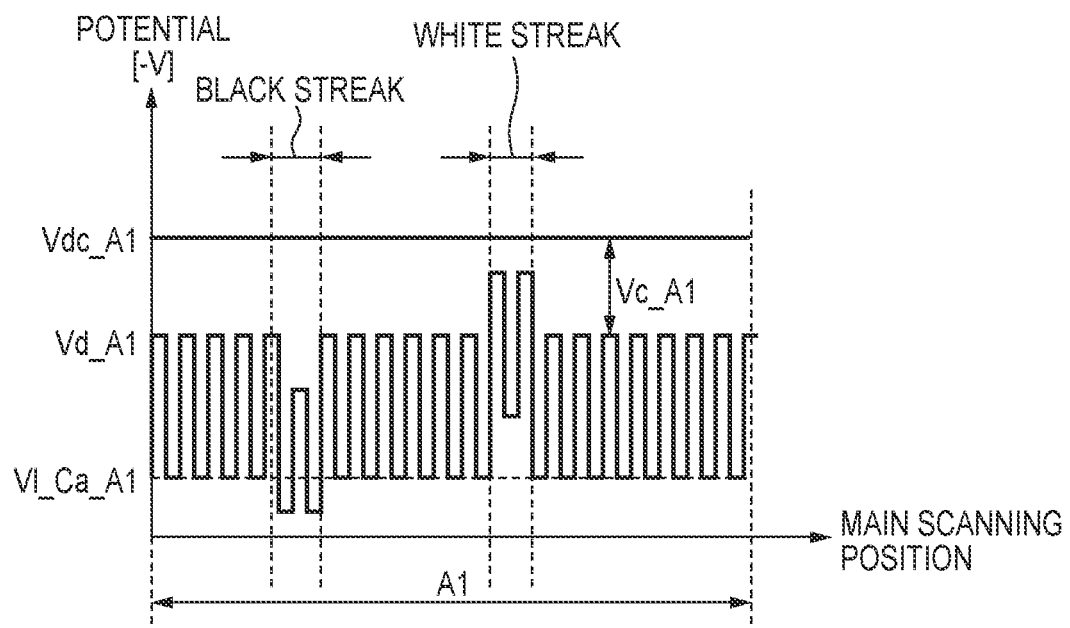
FIGS. 19A to 19D are views for describing a method for forming a camouflage pattern of a self-color.
Figure 19B:
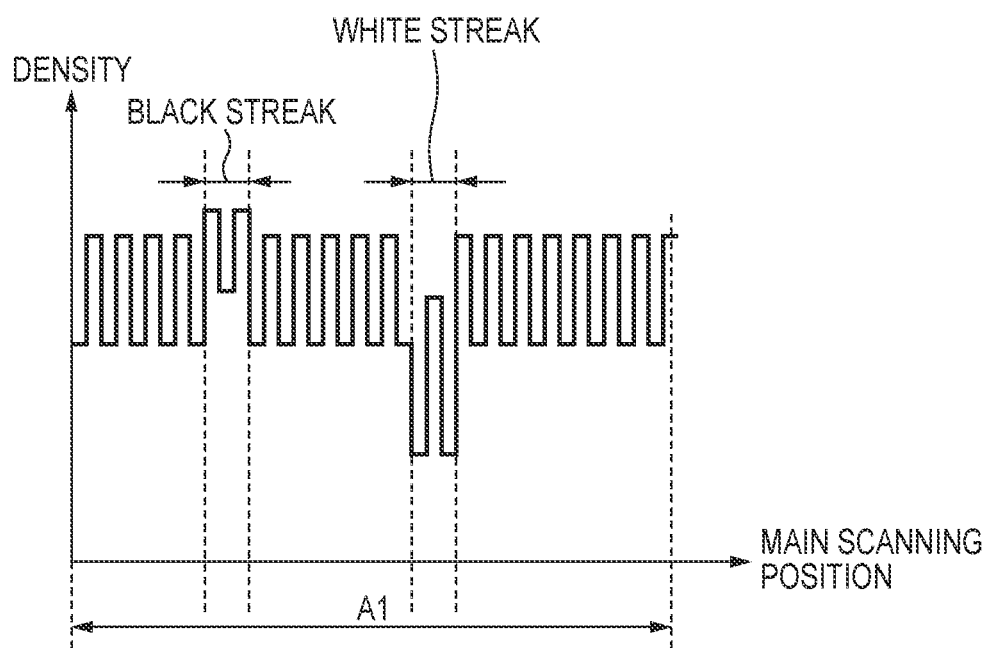

FIG. 19A through FIG. 19D are views for describing a method for forming a camouflage pattern in accordance with a self-color. Note that it is assumed that the charging potential Vd and the developing potential Vdc in FIG. 19A and FIG. 19B are the same as the charging potential Vd and the developing potential Vdc in FIG. 13C and FIG. 13E.

As illustrated by FIG. 19A, the chart generation unit 64 sets the charging potential Vd_A1 for the charger unit 12 of the image forming station of each color in order to form an analog pattern A1-P. In addition, the chart generation unit 64 sets the developing potential Vdc_A1 for the developing unit 14 of the image forming station of each color. Furthermore, the chart generation unit 64 outputs, to the exposure unit 13 of the image forming station of each color, an image signal for forming the camouflage pattern A1-Ca of a self-color. By the exposure unit 13 exposing an image carrying member in accordance with the image signal, the latent image potential of an exposed region becomes Vl_Ca_A1. As a result, a camouflage pattern A1-Ca of a self-color is formed on the analog pattern A1-P, as illustrated by FIG. 19B. In other words, the yellow analog pattern A1-P-Y has a yellow camouflage pattern A1-Ca-Y. The magenta analog pattern A1-P-M has a magenta camouflage pattern A1-Ca-M. The cyan analog pattern A1-P-C has a cyan camouflage pattern A1-Ca-C. The black analog pattern A1-P-Bk has a black camouflage pattern A1-Ca-Bk.

Figure 19C:
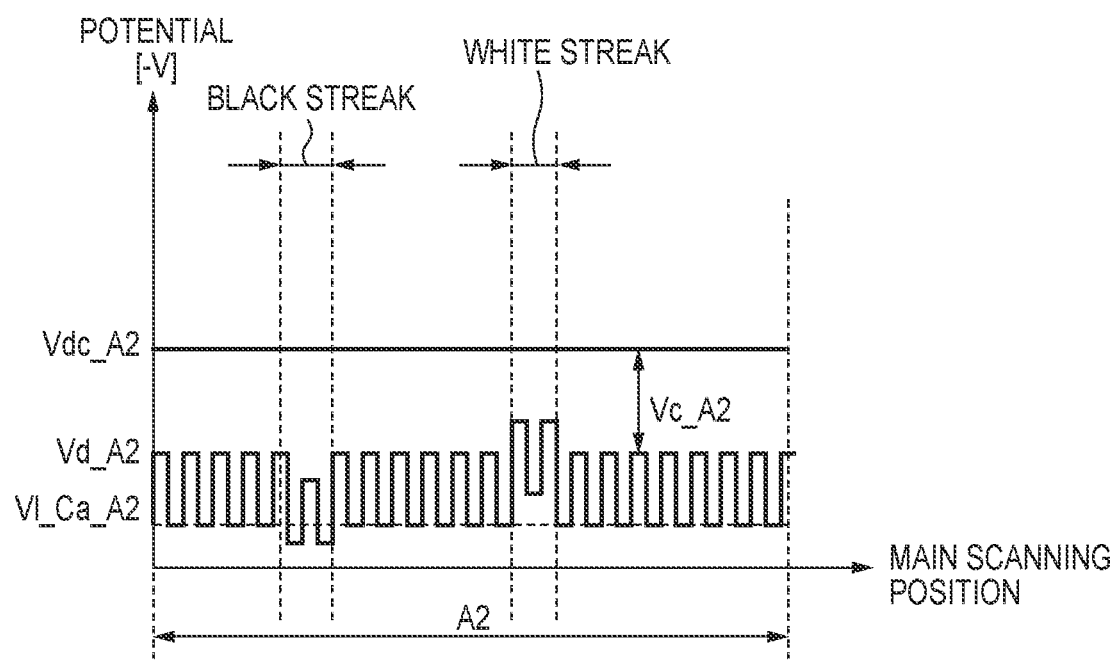
Figure 19D:
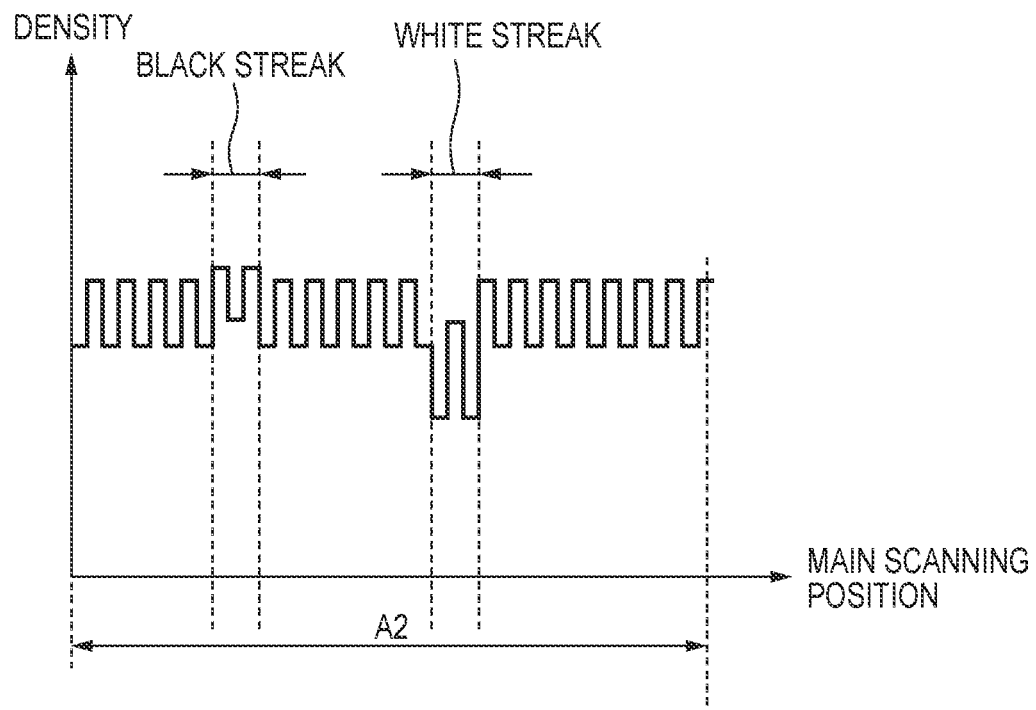

As illustrated by FIG. 19C, the chart generation unit 64 sets the charging potential Vd_A2 for the charger unit 12 of the image forming station of each color in order to form an analog pattern A2-P. In addition, the chart generation unit 64 sets the developing potential Vdc_A2 for the developing unit 14 of the image forming station of each color. Furthermore, the chart generation unit 64 outputs, to the exposure unit 13 of the image forming station of each color, an image signal for forming the camouflage pattern A2-Ca of a self-color. By the exposure unit 13 exposing an image carrying member in accordance with the image signal, the potential of an exposed region becomes Vl_Ca_A2. As a result, an analog pattern A2-P has a camouflage pattern A2-Ca of a self-color, as illustrated by FIG. 19D. In other words, the yellow analog pattern A2-P-Y has a yellow camouflage pattern A2-Ca-Y. The magenta analog pattern A2-P-M has a magenta camouflage pattern A2-Ca-M. The cyan analog pattern A2-P-C has a cyan camouflage pattern A2-Ca-C. The black analog pattern A2-P-Bk has a black camouflage pattern A2-Ca-Bk.

Typically a large amount of time is necessary to make the charging potential Vd transition to and stabilize at a target potential. In particular, it is difficult to make the charging potential stabilize among a plurality of image forming stations in a predetermined amount of time when generating a mixed color camouflage pattern that is formed using toner of differing colors. Alternatively a very expensive power supply would be necessary. In contrast, such adjusting time is greatly shortened when the color of an analog pattern and the color of a camouflage pattern are caused to match. In other words, it is possible to efficiently generate the charts 301 through 303.

Third Embodiment

In the first embodiment, by generating the charts 301 through 303 that include a plurality of analog patterns A1-P and A2-P having the same optical density but different charging potentials, it is identified whether a streak causal part is the charger unit 12 or the developing unit 14. However, it is difficult to detect a slight charge defect simply by causing the charging potential to differ. This is because with a slight charge defect, a difference between a streak in an analog pattern A1-P and a streak in an analog pattern A2-P does not become sufficiently large.

Accordingly, the image forming apparatus 1 of the third embodiment performs charge processing in accordance with the charger unit 12 to form an analog pattern A1-P, and forms an analog pattern A2-P without performing charge processing in accordance with the charger unit 12. Consequently, the analog pattern A2-P becomes an image pattern that is not impacted by a charge defect. For this reason, it is possible to detect even a slight charge defect by comparing an analog pattern A1-P formed by applying charge processing and an analog pattern A2-P formed without applying charge processing. That is, it becomes possible to distinguish whether the cause of the streak is a charge defect or a developing coat defect. Note that the third embodiment is similar to the first embodiment except for a method for forming an analog pattern A2-P and processing for identifying a replacement part. Accordingly description of portions already described is omitted.

Incidentally, when forming an analog pattern A2-P without performing charge processing in accordance with the charger unit 12, it is difficult to superimpose a camouflage pattern A2-Ca on the analog pattern A2-P. This is because time for switching voltages is necessary. In the following description, a method for forming an analog pattern A2-P without performing charge processing in accordance with the charger unit 12, and superimposing a camouflage pattern A2-Ca is described.

[Method for Forming the Analog Pattern A2]

In a contact charging scheme, when the charge control unit 65 sets an applied voltage Vin to be applied to a charging member of the charger unit 12 to a discharge start voltage Vth or less, the charging potential Vd of the photosensitive drum 11 becomes approximately 0 [V]. In this way, in the second embodiment, the charging potential of the photosensitive drum 11 is controlled to be approximately 0[V] by setting the applied voltage Vin to a voltage (example: 0[V]) less than or equal to the discharge start voltage Vth (example: 400[V]).

Charge on the surface of the photosensitive drum 11 may be removed in order to further reduce an impact of the charger unit 12 on the analog pattern A2-P. For example, a light irradiation for destaticization from a pre-exposure light source in relation to the front surface of the photosensitive drum 11 which is cleaned by the drum cleaner 15 may be performed. In a case where a non-contact charging scheme is used, configuration may be taken such that charge processing is not applied to the photosensitive drum 11, by controlling the charging power supply 68 so that the charge control unit 65 does not supply current to a metal wire.

[Arrangement of Analog Patterns A1-P and A2-P]

FIG. 20 illustrates an arrangement of analog patterns A1-P and A2-P in the third embodiment. In the third embodiment, differences with the first embodiment are that the charts 302 and 303 are substituted by the charts 302' and 303'. In the chart 302' the analog patterns A1-P-Y and A1-P-M for which charging is applied, and the analog patterns A2-P-C and A2-P-Bk for which charging is not applied are formed. In the chart 303' the analog patterns A2-P-Y and A2-P-M for which charging is applied, and the analog patterns A1-P-C and A1-P-Bk for which charging is not applied are formed.

Two constraint conditions are imposed for colors that can be used for forming a camouflage pattern in the third embodiment. The first is that the color of a camouflage pattern must be a different color to the color of an analog pattern. For example, for the camouflage pattern A1-Ca-Y added to the yellow analog pattern A1-P-Y for which charging is applied in the chart 302', toner of color other than yellow must be used. In other words, a camouflage pattern must be formed using colors for one or more types of toner that are different from the color of toner used to form an analog pattern. The second is that, so that time for switching charging potentials is sufficiently guaranteed, a color of toner of an analog pattern A2-P formed without charging being applied for the same sheet (page) must not be used. For example, cyan and black are used for the analog patterns A2-P-C and A2-P-Bk for which charging is not applied. Accordingly, cyan and black must not be used for the camouflage pattern A1-Ca-Y. Here, the camouflage pattern A1-Ca-Y is formed using magenta toner, for example.

FIG. 21A is a table illustrating combinations of image pattern colors and camouflage pattern colors. In the chart 302', the camouflage pattern A1-Ca-M that is added to the magenta analog pattern A1-P-M is formed using yellow toner. In the chart 303', the camouflage pattern A1-Ca-C that is added to the cyan analog pattern A1-P-C is formed using black toner. In the chart 303', the camouflage pattern A1-Ca-Bk that is added to the black analog pattern A1-P-Bk is formed using cyan toner.

For the camouflage pattern A2-Ca-C that is added to the cyan analog pattern A2-P-C for which charging is not applied with the chart 302', toner of a color other than cyan must be used based on the first condition. In addition, based on the second condition, the camouflage pattern A2-Ca-C which is superimposed on the analog pattern A2-P-C must not be cyan or black. Accordingly, the camouflage pattern A2-Ca-C must be only yellow toner or only magenta toner. Only yellow toner or only magenta toner must be used for the camouflage pattern A2-Ca-Bk that is superimposed on the black analog pattern A2-P-Bk for which charging is not applied with the chart 302'. Only cyan toner or only black toner must be used for the camouflage pattern A2-Ca-Y that is superimposed on the yellow analog pattern A2-P-Y for which charging is not applied with the chart 303'. Only cyan toner or only black toner must be used for the camouflage pattern A2-Ca-M that is superimposed on the magenta analog pattern A2-P-M for which charging is not applied with the chart 303'.

Incidentally, the analog patterns A1-P-Y, A1-P-M, A1-P-C, and A2-P-Bk may be formed on the chart 302', and the analog patterns A2-P-Y, A2-P-M, A2-P-C, and A1-P-Bk may be formed on the chart 303'. However, the above two constraint conditions are imposed even in this case.

FIG. 21B is a table illustrating combinations of image pattern colors and camouflage pattern colors. As illustrated by FIG. 21B, there are respective toner colors that can be formed on each camouflage pattern in the chart 302'. However, there is no toner color that can form the camouflage pattern A1-Ca-Bk in the chart 303'. In other words, it is not possible to add a camouflage pattern to the analog pattern A1-P-Bk. Accordingly, in a case of arranging the analog patterns A1-P for which charging is applied and the analog patterns A2-P for which charging is not applied on two charts, it should be advantageous to divide YMCBk into two groups of two colors each.

[Replacement Part Identification Processing]

Figure 22A:
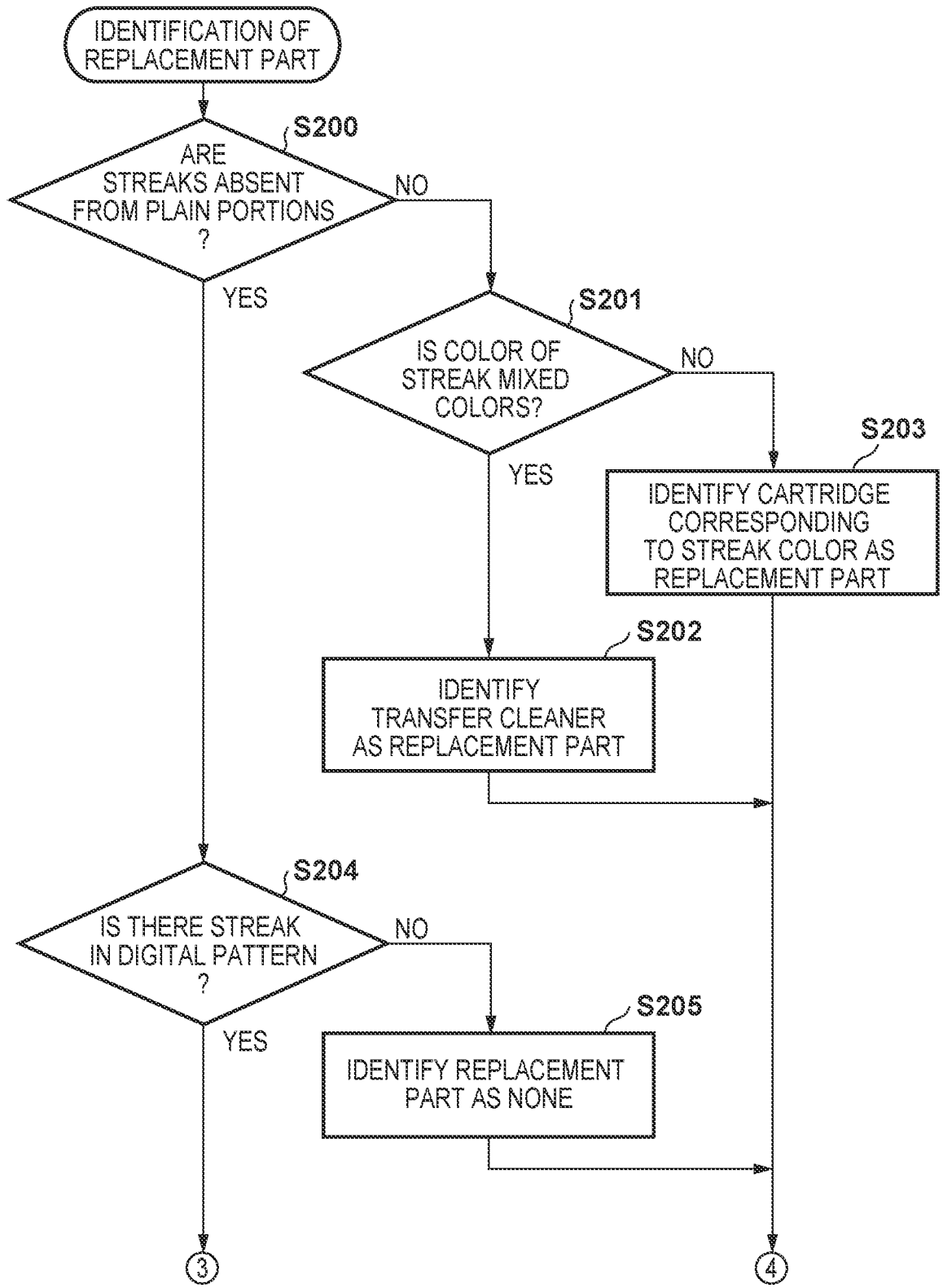
FIGS. 22A and 22B are flowcharts illustrating processing for identifying a replacement part.
Figure 22B:
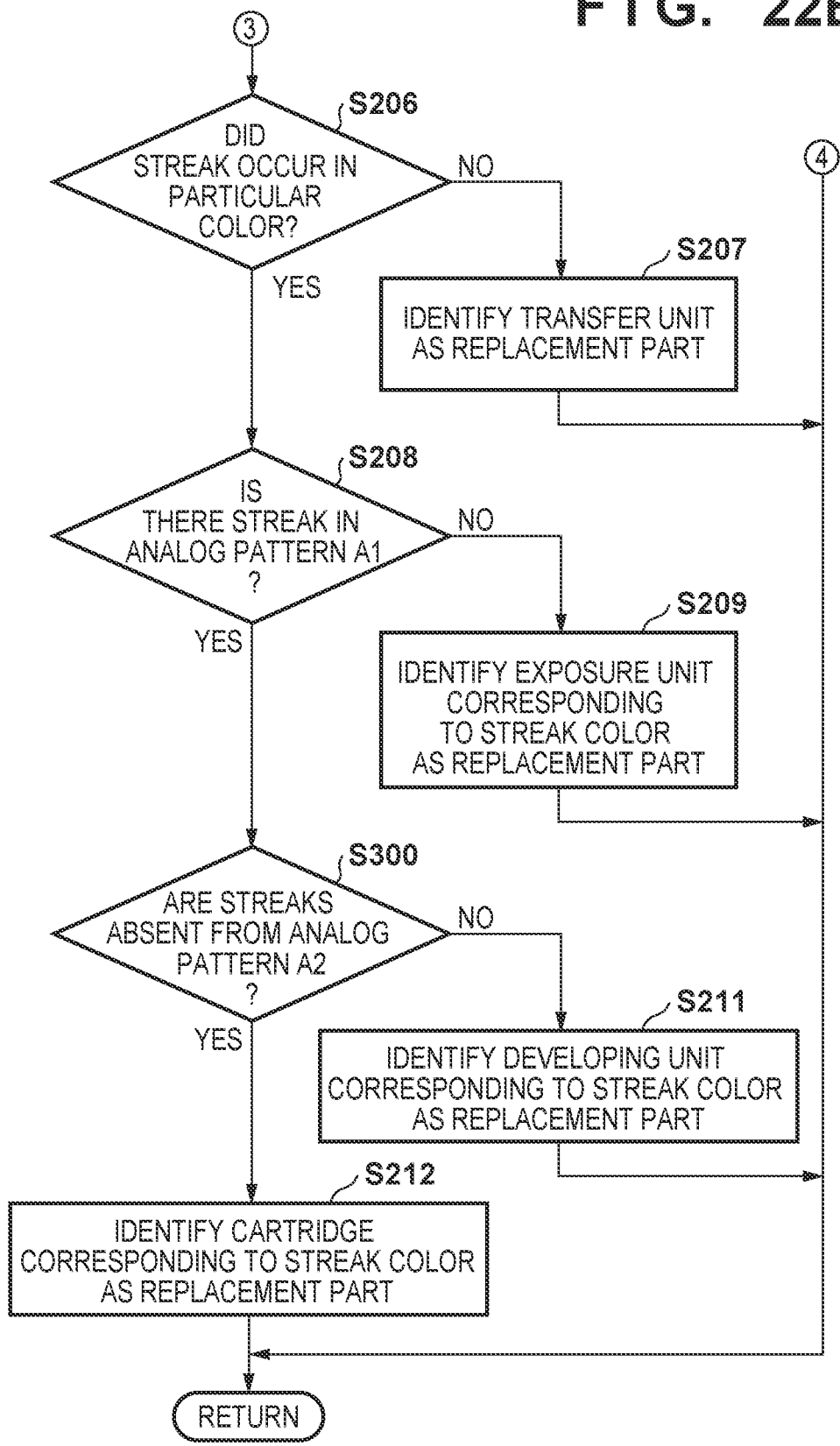

FIGS. 22A and 22B are flowcharts illustrating details of processing for identifying a replacement part and a response method. In FIGS. 22A and 22B, a difference with FIGS. 16A and 16B is that step S210 is substituted with step S300. In step S300, the CPU 60 reads feature amounts from the storage apparatus 63, and determines whether streaks are absent from the analog patterns A2-P. If there is no streak in the analog patterns A2-P, the CPU 60 advances to step S211. If there is no streak in the analog patterns A2-P, the CPU 60 advances to step S212. That is, if there is no streak in the analog patterns A2, the CPU 60 identifies a charge defect as the cause of the streak, and identifies the process cartridge 50 including the charger unit 12 as the replacement part. Also, the replacement part is a replacement part corresponding to the color of the streak. For example, while there is a streak in a yellow analog pattern A1-P, if there is no streak in a yellow analog pattern A2-P, the process cartridge 50 that is responsible for yellow is identified as a replacement part.

In the third embodiment with such a configuration, the charts 302' and 303' which include the analog patterns A1-P formed by applying charging, and the analog patterns A2-P formed without charging being applied are generated. By this, it is possible to distinguish a streak caused by a slight charge defect and a streak caused by the developing unit 14. In this way, with the third embodiment, it is possible to reliably distinguish even a slight charge defect which is difficult to distinguish with the first embodiment. In other words, it is possible to determine with high precision whether a streak causal part is the charger unit 12 or the developing unit 14.

The third embodiment can also be applied to a case where charging is off (Vd_A2=0V), and not just a case where charging is on. As illustrated by FIG. 21A, by controlling the exposure unit 13, the CPU 60 uses toner of a color different from the color of a first non-exposure image (for example: an analog pattern A1-P) to add to the first non-exposure image a camouflage pattern for obscuring an image defect that is not of interest. Furthermore, by controlling the exposure unit 13, the CPU 60 uses toner of a color different from the color of a second non-exposure image (for example: an analog pattern A2-P) to add a camouflage pattern to the second non-exposure image. By this, it is possible to add a camouflage pattern to an analog pattern even with a cheap power supply that has a low speed for switching a charging potential or a developing potential.

Furthermore, by controlling the image forming device 10, the CPU 60 may form on the chart 302', which is a first sheet, the first non-exposure image of a first color, the first non-exposure image of a second color, the second non-exposure image of a third color, and the second non-exposure image of the fourth color. Furthermore, by controlling the image forming device 10, the CPU 60 may form on the chart 303', which is a second sheet, the first non-exposure image of a first color, the first non-exposure image of a second color, the second non-exposure image of a third color, and the second non-exposure image of the fourth color.

As illustrated by FIG. 21A, the colors of the camouflage patterns A1-Ca and A2-Ca are restricted. In the chart 302', the color of the camouflage pattern A1-Ca-Y added to the first non-exposure image of the first color is the second color. In the chart 302', the color of the camouflage pattern A1-Ca-M added to the first non-exposure image of the second color is the first color. In the chart 302', the color of the camouflage pattern A2-Ca-C added to the second non-exposure image of the third color is the first color or the second color. In the chart 302', the color of the camouflage pattern A2-Ca-Bk added to the second non-exposure image of the fourth color is the first color or the second color.

Similarly, in the chart 303', the color of the camouflage pattern A2-Ca-Y added to the second non-exposure image of the first color is the third color or the fourth color. In the chart 303', the color of the camouflage pattern A2-Ca-M added to the second non-exposure image of the second color is the third color or the fourth color. In the chart 303', the color of the camouflage pattern A1-Ca-C added to the first non-exposure image of the third color is the fourth color. In the chart 303', the color of the camouflage pattern A1-Ca-Bk added to the first non-exposure image of the fourth color is the third color.

Figure 23:
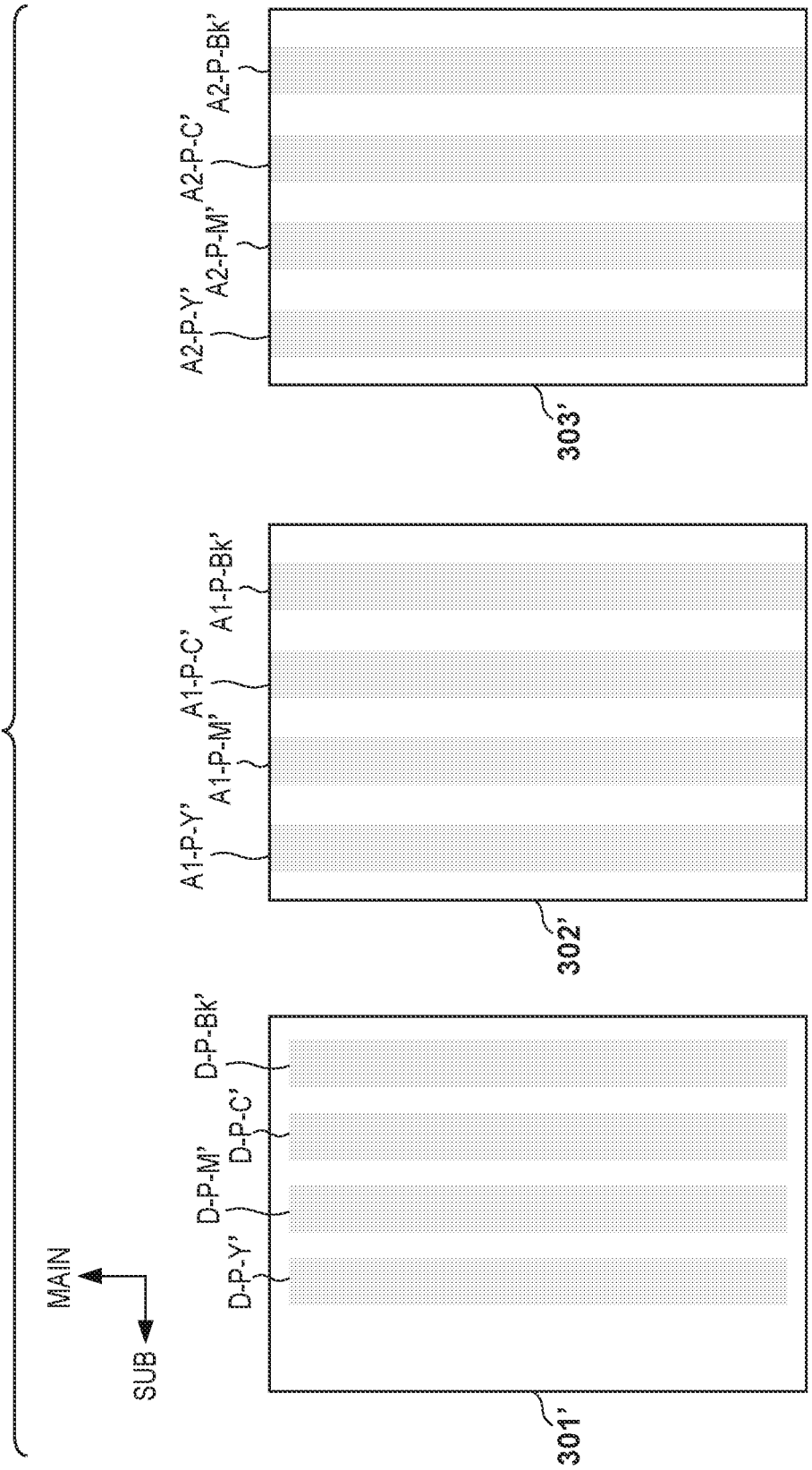
FIG. 23 is a view for illustrating a test chart that does not have a camouflage pattern.

In addition, configuration may be taken such that the image forming apparatus 1 recited in the first, second and third embodiments can execute a first mode for outputting a test chart having camouflage patterns, and a second mode for outputting a test chart that does not have camouflage patterns. With this configuration, when the first mode is selected in the input apparatus 62, the CPU 60 is inputted with an execution command for the first mode from the input apparatus 62. When inputted with the execution command for the first mode, the chart generation unit 64 of the CPU 60, in step S101, forms on sheets S the charts 301, 302, and 303 based on pattern image data PG1 stored in the storage apparatus 63. In contrast, when the second mode is selected in the input apparatus 62, the CPU 60 is inputted with an execution command for the second mode from the input apparatus 62. When inputted with the execution command for the second mode, the chart generation unit 64 of the CPU 60, in step S101, forms on sheets S the charts 301', 302', and 303', which do not have camouflage patterns, based on pattern image data PG2 stored in the storage apparatus 63. The charts 301', 302', and 303' illustrated in FIG. 23 are test charts outputted in the second mode. The charts 301', 302', and 303' do not have camouflage patterns. The charts 301', 302', and 303' are used to confirm an image defect other than a streak, for example. Note that an image defect that occurs in the charts 301, 302, and 303 having camouflage patterns does not stand out more than an image defect occurring in the charts 301', 302', and 303' which do not have camouflage patterns.

The following aspects are derived from the above-described disclosure.

<Aspect 1> An image forming apparatus, comprising:
a reader configured to read an original;
a printer configured to form an image on a sheet based on a read result of the reader; and
a controller configured to:
control the printer to form a test chart on the sheet, the test chart being used for detecting a causal part of a streak that occurs when an image is formed by the printer; and
control the reader to read the test chart,
wherein
the test chart has a pattern for obscuring an image defect occurring when the test chart is formed by the printer.

<Aspect 2> The image forming apparatus according to aspect 1, wherein
the causal part corresponds to a unit that should be replaced out of a plurality of units arranged in the printer.

<Aspect 3> The image forming apparatus according to aspect 1, wherein
the controller controls the printer to form a predetermined test chart that does not have the pattern on another sheet, and
the image defect occurring in the test chart does not stand out more than the image defect occurring in the predetermined test chart.

<Aspect 4> The image forming apparatus according to aspect 1, wherein
the test chart has a test image of a predetermined color,
the pattern has the predetermined color,
the pattern is superimposed on the test image, and
a density of the pattern differs to a density of a region in the test image where the pattern is not formed.

<Aspect 5> The image forming apparatus according to aspect 1, wherein
the printer has a plurality of image forming units, wherein the plurality of image forming units forms images, each having different color,
the test chart includes a first test image of a first color, and a second test image of a second color different from the first color,
the first test image has a pattern of the first color,
the second test image has a pattern of the second color,
a density of the pattern of the first color differs to a density of a region in the first test image where the pattern of the first color is not formed, and
a density of the pattern of the second color differs to a density of a region in the second test image where the pattern of the second color is not formed.

<Aspect 6> The image forming apparatus according to aspect 1, wherein
the printer has a plurality of image forming units, wherein the plurality of image forming units forms images, each having different color,
the test chart includes a first test image of a first color, and a second test image of a second color different from the first color,
the first test image has a pattern of another color different from the first color, and
the second test image has a pattern of another color different from the second color.

<Aspect 7> The image forming apparatus according to aspect 1, wherein
a power of a test chart having the pattern is larger than $1.30 \times 10^{-6}$ [mm2] in a case where a spatial frequency is 1.0 [cycle/mm].

<Aspect 8> The image forming apparatus according to aspect 1, wherein
the printer conveys the sheet,
the pattern includes a plurality of color images,
each of the plurality of color images is separated by a first interval in a conveyance direction of the sheet,
each of the plurality of color images is separated by a second interval in a direction orthogonal to the conveyance direction,
a length in the conveyance direction of each of the plurality of color images is greater than or equal to 0.1 [mm] and less than or equal to 5.0 [mm], and
a power of a test chart having the pattern is larger than $1.30 \times 10\text{-}6$ [mm2] in a case where a spatial frequency is 1.0 [cycle/mm].

<Aspect 9> The image forming apparatus according to aspect 1, wherein
the printer conveys the sheet,
the pattern includes a plurality of color images,
each of the plurality of color images is separated by a predetermined interval in a conveyance direction of the sheet,
each of the plurality of color images is separated by a first interval in a conveyance direction of the sheet,
a length in a direction orthogonal to the conveyance direction of each of the plurality of color images is greater than or equal to 0.1 [mm] and less than or equal to 5.0 [mm], and
a power of a test chart having the pattern is larger than $1.30 \times 10\text{-}6$ [mm2] in a case where a spatial frequency is 1.0 [cycle/mm].

<Aspect 10> The image forming apparatus according to aspect 1, wherein
the printer conveys the sheet,
the pattern includes a plurality of color images, and
two color images adjacent in the conveyance direction of the sheet out of the plurality of color images are shifted in a direction orthogonal to the conveyance direction.

<Aspect 11> The image forming apparatus according to aspect 1, further comprising
a display configured to display the detected causal part.

<Aspect 12> The image forming apparatus according to aspect 1, further comprising
a display configured to, based on the detected causal part, display a unit that should be replaced out of a plurality of units arranged in the printer.

<Aspect 13> An image forming apparatus, comprising:
a reader configured to read an original;
a printer configured to form an image on a sheet based on a read result of the reader; and
a controller configured to:
form a test chart on the sheet by the printer, the test chart being
control the printer to form a test chart on the sheet, the test chart being used for detecting a causal part of a streak that occurs when an image is formed by the printer; and
control the reader to read the test chart,
wherein
the test chart has a plurality of blank regions for obscuring an image defect occurring when the test chart is formed by the printer.

<Aspect 14> The image forming apparatus according to aspect 13, wherein
the causal part corresponds to a unit that should be replaced out of a plurality of units arranged in the printer.

<Aspect 15> The image forming apparatus according to aspect 13, wherein
the controller controls the printer to form a predetermined test chart that does not have the plurality of blank regions on another sheet, and
the image defect occurring the test chart does not stand out more than the image defect occurring in the predetermined test chart.

<Aspect 16> The image forming apparatus according to aspect 13, wherein
a power of a test chart having the plurality of blank regions is larger than $1.30 \times 10\text{-}6$ [mm2] in a case where a spatial frequency is 1.0 [cycle/mm].

<Aspect 17> The image forming apparatus according to aspect 13, wherein
the printer conveys the sheet,
each of the plurality of blank regions is separated by a first interval in a conveyance direction of the sheet,
each of the plurality of blank regions is separated by a second interval in a direction orthogonal to the conveyance direction,
a length in the conveyance direction of each of the plurality of blank regions is greater than or equal to 0.1 [mm] and less than or equal to 5.0 [mm], and
a power of a test chart having the pattern is larger than $1.30 \times 10\text{-}6$ [mm2] in a case where a spatial frequency is 1.0 [cycle/mm].

<Aspect 18> The image forming apparatus according to aspect 13, wherein
the printer conveys the sheet,
each of the plurality of blank regions is separated by a first interval in a conveyance direction of the sheet,
each of the plurality of blank regions is separated by a second interval in a direction orthogonal to the conveyance direction,
a length in a direction orthogonal to the conveyance direction of each of the plurality of blank regions is greater than or equal to 0.1 [mm] and less than or equal to 5.0 [mm], and
a power of a test chart having the pattern is larger than $1.30 \times 10\text{-}6$ [mm2] in a case where a spatial frequency is 1.0 [cycle/mm].

<Aspect 19> The image forming apparatus according to aspect 13, wherein
the printer conveys the sheet,
two blank regions adjacent in the conveyance direction of the sheet out of the plurality of blank regions are shifted in a direction orthogonal to the conveyance direction.

<Aspect 20> The image forming apparatus according to aspect 13, further comprising
a display configured to, based on the detected causal part, display a unit that should be replaced out of a plurality of units arranged in the printer.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-151757, filed Aug. 4, 2017, which is hereby incorporated by reference herein in its entirety.

What is claimed is:

1. An image forming apparatus, comprising:
a reader;
a printer configured to form an image on a sheet; and
a controller configured to:
control the printer to form a test chart on the sheet, the test chart being used to detect a first type of an image defect that occurs when an image is formed by the printer; and
control the reader to read the test chart,
wherein
the test chart has a pattern for visually obscuring a second type of an image defect of the test chart when the test chart is viewed by a user,
the first type of the image defect is a streak, and
the second type of the image defect is an image defect other than a streak.

2. The image forming apparatus according to claim 1, wherein
the controller controls the printer to form a predetermined test chart that does not have the pattern on another sheet, and
the second type of the image defect occurring in the test chart does not stand out more than the second type of the image defect occurring in the predetermined test chart.

3. The image forming apparatus according to claim 1, wherein
the test chart has a test image of a predetermined color,
the pattern has the predetermined color,
the pattern is superimposed on the test image, and
a density of the pattern differs from a density of a region in the test image where the pattern is not formed.

4. The image forming apparatus according to claim 1, wherein
the printer has a plurality of image forming units, wherein the plurality of image forming units forms images, each having different color,
the test chart includes a first test image of a first color, and a second test image of a second color different from the first color,
the first test image has a pattern of the first color,
the second test image has a pattern of the second color,
a density of the pattern of the first color differs from a density of a region in the first test image where the pattern of the first color is not formed, and
a density of the pattern of the second color differs from a density of a region in the second test image where the pattern of the second color is not formed.

5. The image forming apparatus according to claim 1, wherein
the printer has a plurality of image forming units, wherein the plurality of image forming units forms images, each having different color,
the test chart includes a first test image of a first color, and a second test image of a second color different from the first color,
the first test image has a pattern of another color different from the first color, and
the second test image has a pattern of another color different from the second color.

6. The image forming apparatus according to claim 1, wherein
a power of a test chart having the pattern is greater than $1.30 \times 10^{-6}$ mm$^2$ in a case in which a spatial frequency is 1.0 cycle/mm.

7. The image forming apparatus according to claim 1, wherein
the printer conveys the sheet,
the pattern includes a plurality of color images,
each of the plurality of color images is separated by a first interval in a conveyance direction of the sheet,
each of the plurality of color images is separated by a second interval in a direction orthogonal to the conveyance direction,
a length in the conveyance direction of each of the plurality of color images is greater than or equal to 0.1 mm and less than or equal to 5.0 mm, and
a power of a test chart having the pattern is greater than $1.30 \times 10^{-6}$ mm$^2$ in a case in which a spatial frequency is 1.0 cycle/mm.

8. The image forming apparatus according to claim 1, wherein
the printer conveys the sheet,
the pattern includes a plurality of color images,
each of the plurality of color images is separated by a first interval in a conveyance direction of the sheet,
each of the plurality of color images is separated by a second interval in a direction orthogonal to the conveyance direction,
a length in a direction orthogonal to the conveyance direction of each of the plurality of color images is greater than or equal to 0.1 mm and less than or equal to 5.0 mm, and
a power of a test chart having the pattern is greater than $1.30 \times 10^{-6}$ mm$^2$ in a case in which a spatial frequency is 1.0 cycle/mm.

9. The image forming apparatus according to claim 1, wherein
the printer conveys the sheet,
the pattern includes a plurality of color images, and
two color images adjacent in a conveyance direction of the sheet out of the plurality of color images are shifted in a direction orthogonal to the conveyance direction.

10. The image forming apparatus according to claim 1, further comprising a display configured to display a causal part based on a detection result of the first type of the image defect.

11. The image forming apparatus according to claim 1, further comprising a display configured to, based on a detection result of the first type of the image defect, display a unit that should be replaced out of a plurality of units arranged in the printer.

* * * * *